US012506260B2

(12) United States Patent
Mauda

(10) Patent No.: US 12,506,260 B2
(45) Date of Patent: Dec. 23, 2025

(54) SYSTEM AND METHOD FOR TRANSMITTING RADIO FREQUENCY RADIATION

(71) Applicant: ELTA SYSTEMS LTD., Ashdod (IL)

(72) Inventor: Roi Mauda, Paduel (IL)

(73) Assignee: ELTA SYSTEMS LTD., Ashdod (IL)

( * ) Notice: Subject to any disclaimer, the term of this patent is extended or adjusted under 35 U.S.C. 154(b) by 500 days.

(21) Appl. No.: 17/999,604

(22) PCT Filed: Apr. 28, 2021

(86) PCT No.: PCT/IL2021/050493
§ 371 (c)(1),
(2) Date: Nov. 22, 2022

(87) PCT Pub. No.: WO2021/240498
PCT Pub. Date: Dec. 2, 2021

(65) Prior Publication Data

US 2023/0238698 A1 Jul. 27, 2023

(30) Foreign Application Priority Data

May 24, 2020 (IL) .......................................... 274890

(51) Int. Cl.
*H01Q 3/26* (2006.01)
*H01Q 3/28* (2006.01)
*H01Q 3/34* (2006.01)

(52) U.S. Cl.
CPC ........... *H01Q 3/2605* (2013.01); *H01Q 3/267* (2013.01); *H01Q 3/28* (2013.01); *H01Q 3/34* (2013.01)

(58) Field of Classification Search
CPC ........ H01Q 3/28; H01Q 3/2605; H01Q 3/267; H01Q 3/34–42
See application file for complete search history.

(56) References Cited

U.S. PATENT DOCUMENTS 5,396,256 A 3/1995 Chiba et al.
5,543,806 A * 8/1996 Wilkinson ........... H01Q 3/2605 342/383
6,070,090 A * 5/2000 Feuerstein ............. H01Q 1/246 455/562.1

(Continued)

*Primary Examiner* — Cassi J Galt
(74) *Attorney, Agent, or Firm* — FisherBroyles, LLP; Roger L. Browdy; James E. Mrose

(57) ABSTRACT

A transmission system and method for transmitting radio frequency (RF) radiation in a predetermined direction at a sequence of K frequencies by an antenna array. The system includes an RF signal generator configured for generating electrical signals having an initial amplitude and an initial phase through transmission channels corresponding to antenna elements of the antenna array at the sequence of K frequencies. The system also includes a modification system, configured for obtaining optimal electrical signals for which a transmission efficiency coefficient of the transmission system is equal to or greater than a predetermined threshold value, and a steering system configured for (i) receiving the optimal electrical signals, (ii) generating steering electrical signals related to the optimal electrical signals and (iii) relaying the steering electrical signals to the antenna array to form a steered beam for transmission in the predetermined direction.

20 Claims, 7 Drawing Sheets

(56) References Cited

U.S. PATENT DOCUMENTS

| | | | | |
|---|---|---|---|---|
| 8,170,510 | B2 * | 5/2012 | Knudsen ................ | H01Q 1/525<br>455/121 |
| 2005/0018597 | A1 | 1/2005 | Yuda et al. | |
| 2012/0092217 | A1 | 4/2012 | Hosoya et al. | |
| 2015/0236413 | A1 | 8/2015 | Turpin et al. | |
| 2016/0308597 | A1 | 10/2016 | Kim et al. | |
| 2019/0219619 | A1 | 7/2019 | Walker et al. | |

* cited by examiner

SYSTEM AND METHOD FOR TRANSMITTING RADIO FREQUENCY RADIATION

TECHNOLOGICAL FIELD

The present invention relates to antenna arrays, and more particularly to techniques for transmitting radio frequency (RF) radiation in a predetermined direction within a predetermined frequency band by an antenna array.

BACKGROUND

A phased array antenna is an electronically controlled array of multiple antenna elements which operate together to transmit or receive electro-magnetic radiation. The phased array generates an electro-magnetic radiation beam that can be electronically steered to a desired direction(s) without physically moving the antenna elements. In operation, the electro-magnetic waves, radiated by each antenna element, combine and superpose (i.e., interfering constructively) to enhance the power of the beam radiated in desired direction(s), while suppressing and reducing the power of radiation (i.e. interfering destructively) in other undesired directions.

In a phased array, each antenna element is fed with a signal provided by a steering system. The steering system includes a plurality of phase shifters and amplifiers, which are typically controlled by a computer system that can alter the phase and amplitude of the signal electronically, thereby steering the beam of the phased array antenna to the desired direction(s).

Usually, when antenna arrays operate at a frequency range of up to 3 octaves, for example: 2-6 GHz, 6-18 GHz, etc. (i.e., when the maximum frequency of the range is up to 3 times the lower frequency), "null points" may appear in the gain diagram at certain frequencies beyond this range due to mutual coupling between the antenna elements of the phased array. Null points occur at the frequencies at which the amount of transmitted energy is less than a certain value. At these null points, some part of the energy is reflected back to the system from the antenna elements that may cause severe damage to the system.

One reason for mutual coupling between the antenna elements stems from reflection, diffraction and scattering of the radiation, thus causing interchange of energy between the antenna elements.

Another reason for mutual coupling is due to the fact that a part of the phase shifted current, which is directed to a certain antenna element, may reach other neighboring antenna elements. Accordingly, the currents are not fully radiated by the corresponding antenna elements, which can result in decrease of the efficiency of the radiating elements.

In phased array antenna systems, the operation frequency bandwidth is determined by the distance between the antenna elements of the phased array system, while the gain is determined by the number of antenna elements in the phased array system.

GENERAL DESCRIPTION

Prior art phased array antenna systems suffer from several drawbacks since the frequency bandwidth in such systems can only be tailored by changing the structural parameters of the system, i.e., changing the distance between the antenna elements of the phased array antenna. Another drawback is the fact that some of the energy is transmitted in undesired directions, thereby forming sidelobes. Accordingly, the gain in the direction of interest can be decreased.

Thus, there is still a need in the art for, and it would be useful to have, a novel system for operating the phased array system at frequencies outside the predetermined bandwidth of transmission of the phased array system without changing the structural parameters of this system.

It would be advantageous to have a phased array system that can provide a high antenna gain, while attenuating the reflected energy at the null points.

The present invention addresses the deficiencies of conventional phased array systems, and provides a novel transmission system for transmitting radio frequency (RF) radiation in a predetermined direction at a sequence of K frequencies selected from a predetermined frequency range by an antenna array that comprises a predetermined number N of antenna elements. It should be noted that the predetermined frequency range can include null points that occur at certain frequencies within the predetermined frequency range.

According to an embodiment of the present invention, the transmission system includes an RF signal generator. The RF signal generator is configured for generating electrical signals at a sequence of K frequencies. Each electrical signal has an initial amplitude and an initial phase. In operation, the electrical signals are relayed to the phased antenna array at the sequence of K frequencies through N transmission channels corresponding to the N antenna elements.

According to an embodiment, the transmission system also includes a modification system arranged downstream of the RF signal generator. In the present application, an arrangement of one element downstream of another element implies electrical coupling of these elements to each other with a possibility to transfer electrical signals between the elements in the direction of the current associated with the transferring of the electrical signals.

The modification system is configured for receiving and processing the electrical signals from the RF signal generator for obtaining optimal electrical signals. In the present application, the optimal electrical signals refer to the electrical signals for which a transmission efficiency coefficient of the transmission system is equal to or greater than a predetermined threshold value. In particular, the optimal electrical signals include optimal unmodified signals provided by the RF signal generator and optimal modified signals generated by the modification system.

According to an embodiment, the transmission system also includes a steering system arranged downstream of said modification system and coupled to said antenna array. The steering system is configured for receiving the optimal electrical signals obtained from the modification system and generating steering electrical signals related to the optimal electrical signals. The steering electrical signals are relayed via the N transmission channels to the antenna array to form a steered beam for transmission in the predetermined direction.

According to an embodiment, the modification system includes an efficiency determination unit. The efficiency determination unit is configured for receiving the electrical signals at the sequence of K frequencies from the RF signal generator and for calculating the transmission efficiency coefficient of the transmission system for each k-th frequency $f_k$.

According to an embodiment, the modification system also includes a comparing unit. The comparing unit is configured for receiving the transmission efficiency coefficient for each k-th frequency $f_k$ from the efficiency determination unit and comparing the transmission efficiency coefficient with the predetermined threshold value. The modification system is also configured for separating electrical signals corresponding to the frequencies for which the transmission efficiency coefficient is less than the predetermined threshold value, from the electrical signals corresponding to the frequencies for which the transmission efficiency coefficient is equal to or greater than the predetermined threshold value. In operation, the modification system provides the electrical signals corresponding to the frequencies for which the transmission efficiency coefficient is equal to or greater than the predetermined threshold value to the steering system.

According to an embodiment, the modification system further includes a randomization unit. The randomization unit is configured for receiving the electrical signals corresponding to the frequencies for which the transmission efficiency coefficient is less than a predetermined threshold value, and iteratively modifying these electrical signals by randomizing amplitude and phase of these electrical signals, thereby generating randomized signals. Each randomized signal has a corresponding randomized amplitude and randomized phase. In operation, the modification system provides in each iteration the randomized signals to the efficiency determination unit to calculate transmission efficiency coefficient for the randomized signals.

It should be noted that null-points can occur at one or more frequencies within the sequence of K frequencies. The transmission efficiency coefficient for the electrical signals which correspond to these frequencies (at which null points can occur) is below the predetermined threshold value. The modification system receives and iteratively modifies these electrical signals until the transmission efficiency coefficient for these electrical signals is equal to or greater than the predetermined threshold value. As a result of the iterative modification of these electrical signals, the null points are removed.

According to an embodiment, the optimal modified signals are the randomized signals for which the transmission efficiency coefficient is equal to or greater than the predetermined threshold value. Likewise, the optimal unmodified signals are electrical signals for which the transmission efficiency coefficient is equal to or greater than the predetermined threshold value. It should be noted that the optimal unmodified signals are electrical signals which have the initial amplitude and the initial phase.

According to an embodiment, the randomization system is configured for performing iterative modification of the electrical signals corresponding to the frequencies for which the transmission efficiency coefficient is less than the predetermined threshold value. The iterative modification is performed until the transmission efficiency coefficient for these electrical signals is equal to or greater than the predetermined threshold value.

According to an embodiment, the transmission efficiency coefficient is calculated by:

$$T_k = \frac{E_{trans}}{E_{total}} \cdot 100\%,$$

where $E_{total}$ is the total energy of the electrical signals for the k-th frequency $f_k$ generated by the RF signal generator and $E_{trans}$ is the energy transmitted in operation for the k-th frequency $f_k$.

According to an embodiment, the transmitted energy $E_{trans}$ is calculated by the efficiency determination unit by using the relationship $E_{trans}$=$E_{total}$ $E_{lost}$ where $E_{lost}$ is the energy that is lost by the transmission system in operation for the k-th frequency $f_k$.

According to an embodiment, the lost energy $E_{lost}$ is calculated by:

$$E_{lost} = \sum_{n=1}^{N} |\tilde{s}|_n,$$

where $\tilde{s}_n$ is a combined energy that an n-th antenna element (n=1, 2, . . . , N) in the antenna array receives from neighboring antenna elements and a self-reflected energy of the n-th antenna element.

According to an embodiment, the combined energy $\tilde{s}_n$ is calculated by:

$$\begin{pmatrix} \tilde{s}_1 \\ \tilde{s}_2 \\ \tilde{s}_3 \\ \vdots \\ \tilde{s}_N \end{pmatrix} = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_2} & \cdots s_{N_3} & \cdots & s_{N_N} \end{pmatrix} \cdot \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix},$$

where $$V_k^{init} = \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix}_k$$

is an initial excitation vector representing the electrical signals for N transmission channels for each k-th frequency $f_k$, and $$S = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_2} & \cdots s_{N_3} & \cdots & s_{N_N} \end{pmatrix}$$

is a coupling matrix characterizing mutual coupling between antenna elements and a self-reflected energy of the antenna elements in the antenna array.

According to an embodiment, the transmitted energy $E_{trans}$ of the transmission system is calculated by:

$$E_{trans} = E_{total} - E_{lost} = \sum_{n=1}^{N} \left|A_n e^{j\varphi_n}\right| - \sum_{n=1}^{N} |\tilde{s}|_n$$

According to an embodiment, the randomizing of the amplitude and the phase of the electrical signals is carried out by iteratively generating two random numbers. Each random number is in the interval [0, 1]. The initial amplitude and the initial phase of the electrical signals are multiplied by these two random numbers, correspondingly, thereby generating the randomized signals.

According to an embodiment, the two random numbers are different for each electrical signal in an n-th transmission channel (n=1, 2, . . . , N).

According to an embodiment, the randomization system further includes an optimal efficiency determination system. The optimal efficiency determination system is arranged downstream of the randomization unit and coupled to the comparing unit and to the efficiency determination unit.

According to an embodiment, the optimal efficiency determination system is configured for sub-iteratively modifying the two random numbers, thereby generating in each sub-iteration two modified random numbers. The optimal efficiency determination system is also configured for generating modified randomized signals for which the transmission efficiency coefficient is greater than the transmission efficiency coefficient of the randomized signals by using the two modified random numbers.

According to an embodiment, the optimal efficiency determination system is configured to perform a predetermined number P of sub-iterations to generate the modified randomized signals for which the transmission efficiency coefficient is greater than the transmission efficiency coefficient of the randomized signals provided by the randomization unit.

According to an embodiment, the optimal efficiency determination system includes a modification unit. The modification unit is configured for receiving the electrical signals for which the transmission efficiency coefficient is less than the predetermined threshold value from the comparing unit. The modification unit also receives the corresponding two random numbers for each electrical signal from the randomization unit. The modification unit is also configured for sub-iteratively modifying the electrical signals, thereby generating the modified randomized signals.

The optimal efficiency determination system also includes an efficiency determination sub-unit arranged downstream of the modification unit. The efficiency determination sub-unit is configured for sub-iteratively receiving in each sub-iteration the modified randomized signals from the modification unit and calculating a transmission efficiency coefficient for these modified randomized signals.

The optimal efficiency determination system further includes a storing unit configured for storing the transmission efficiency coefficient for the modified randomized signals and a corresponding excitation vector sub-iteratively received from the efficiency determination sub-unit. The storing unit is also configured for storing the transmission efficiency coefficient for the randomized signals, and a corresponding randomized vector that is iteratively obtained (i.e., obtained in each iteration of the modification system) from the efficiency determination unit.

The optimal efficiency determination system also includes a comparing sub-unit coupled to the storing unit. The comparing sub-unit is configured for sub-iteratively receiving a stored efficiency coefficient from the storing unit and the transmission efficiency coefficient for the modified randomized signals from the efficiency determination sub-unit. The comparing sub-unit is also configured for sub-iteratively comparing the stored efficiency coefficient with the transmission efficiency coefficient of the modified randomized signals. The comparing sub-unit is also configured for providing the transmission efficiency coefficient for the modified randomized signals and the corresponding excitation vector to the storing unit for storing thereof when the value of this transmission efficiency coefficient for the modified randomized signals is greater than the value of said stored efficiency coefficient.

According to an embodiment, the modification of the electrical signals corresponding to the frequencies for which the transmission efficiency coefficient is less than the predetermined threshold value by the modification unit is carried out by multiplying the initial amplitude and the initial phase of each electrical signal by two modified random numbers, correspondingly.

According to an embodiment, the two modified random numbers are generated sub-iteratively by adding $\pm\Delta\beta_1 \cdot p$ and $\pm\Delta\beta_2 \cdot p$ to the two random numbers, correspondingly, where p=1, 2, . . . , P.

According to another general aspect of the present invention, there is provided a method for transmitting radio frequency (RF) radiation in a predetermined direction at a sequence of K frequencies by an antenna array comprising a predetermined number N of antenna elements.

The method includes generating electrical signals having an initial amplitude and an initial phase at a sequence of K frequencies. The method also includes processing the electrical signals and obtaining optimal electrical signals for which the transmission efficiency coefficient is equal to or greater than a predetermined threshold value. The optimal electrical signals include optimal unmodified signals and optimal modified signals. According to an embodiment, the method also includes generating steering electrical signals related to the optimal electrical signals. Then, the method includes forming a steered beam based on the steering electrical signals for transmission in the predetermined direction.

According to another embodiment of the present invention, there is provided a method for the obtaining of the optimal electrical signals. The method includes calculating a transmission efficiency coefficient for each k-th frequency $f_k$ of the sequence of K frequencies; The method also includes comparing the transmission efficiency coefficient for each k-th frequency $f_k$ with a predetermined threshold value.

According to an embodiment, the method also includes separating electrical signals corresponding to the frequencies for which the transmission efficiency coefficient is less than the predetermined threshold value, from the electrical signals corresponding to the frequencies for which the transmission efficiency coefficient is equal to or greater than the predetermined threshold value.

According to an embodiment, the method also includes iteratively modifying the electrical signals corresponding to the frequencies for which the transmission efficiency coefficient is less than a predetermined threshold value. The iterative modification of these electrical signals is carried out by randomizing amplitude and phase of these electrical signals, thereby generating randomized signals. Then, the method also includes providing optimal electrical signals including optimal unmodified signals and optimal modified signals.

According to an embodiment, the optimal modified signals are the randomized signals for which the transmission efficiency coefficient is equal to or greater than the predetermined threshold value, and the optimal unmodified signals are the electrical signals having said initial amplitude and said initial phase for which the transmission efficiency coefficient is equal to or greater than the predetermined threshold value.

According to an embodiment, the iterative modifying of the electrical signals corresponding to the frequencies for which the transmission efficiency coefficient is less than the predetermined threshold value is performed until the transmission efficiency coefficient for these electrical signals is equal to or greater than the predetermined threshold value, thereby generating the optimal modified signals.

According to an embodiment, the transmission efficiency coefficient is calculated by:

$$T_k = \frac{E_{trans}}{E_{total}} \cdot 100\%,$$

where $E_{total}$ is the total energy of the electrical signals for the k-th frequency $f_k$. $E_{trans}$ is the energy transmitted in operation for the k-th frequency $f_k$ calculated by $E_{trans}=E_{total}-E_{lost}$, where $E_{lost}$ is the energy that is lost in operation for the k-th frequency $f_k$.

According to an embodiment, the lost energy $E_{lost}$ is calculated by:

$$E_{lost} = \sum_{n=1}^{N} |\tilde{s}|_n$$

where $\tilde{s}_n$ is a combined energy that an n-th antenna element in the antenna array (14) receives from neighboring antenna elements and a self-reflected energy of the n-th antenna element.

According to an embodiment, the combined energy $\tilde{s}_n$ is calculated by:

$$\begin{pmatrix} \tilde{s_1} \\ \tilde{s_2} \\ \tilde{s_3} \\ \vdots \\ \tilde{s_N} \end{pmatrix} = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_2} & \cdots s_{N_3} & \cdots & s_{N_N} \end{pmatrix} \cdot \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix},$$

where $$V_k^{init} = \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix}_k$$

is an initial excitation vector representing the electrical signals for N transmission channels for each k-th frequency $f_k$ and $$S = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_2} & \cdots s_{N_3} & \cdots & s_{N_N} \end{pmatrix}$$

is a coupling matrix characterizing mutual coupling between antenna elements and the self-reflected energy of the antenna elements in the antenna array (14).

According to an embodiment, the transmitted energy $E_{trans}$ of the transmission system is calculated by:

$$E_{trans} = E_{total} - E_{lost} = \sum_{n=1}^{N} \left|A_n e^{j\varphi_n}\right| - \sum_{n=1}^{N} |\tilde{s}|_n$$

According to an embodiment, randomizing the amplitude and the phase of the electrical signals is carried out by iteratively generating two random numbers. Each random number is in the interval [0, 1]. The initial amplitude and the initial phase of the electrical signals are multiplied by the two random numbers, correspondingly, thereby generating the randomized signal. The two random numbers can be different for each electrical signal in an n-th transmission channel selected from the N transmission channels.

According to an embodiment, iterative modifying of the electrical signals further includes providing modified randomized signals for which the transmission efficiency coefficient is greater than the transmission efficiency coefficient of the randomized signals.

According to another general aspect of the present invention, there is provided a method for providing modified randomized signals for which the transmission efficiency coefficient is greater than the transmission efficiency coefficient of the randomized signals.

According to an embodiment, the method includes receiving and storing the transmission efficiency coefficient of the randomized signals and a corresponding randomized excitation vector. The method also includes sub-iteratively modifying the electrical signals corresponding to the frequencies for which the transmission efficiency coefficient is less than the predetermined threshold value, thereby generating the modified randomized signals. The method also includes sub-iteratively calculating a transmission efficiency coefficient for these modified randomized signals. The method also includes sub-iteratively comparing the transmission efficiency coefficient for the modified randomized signals with a previously stored transmission efficiency coefficient. The method also includes sub-iteratively replacing the previously stored transmission efficiency coefficient and the previously stored randomized excitation vector with the transmission efficiency coefficient for the modified randomized signals and a corresponding modified excitation vector when the transmission efficiency coefficient for the modified randomized signals is greater than the previously stored transmission efficiency coefficient.

According to an embodiment, the providing of the modified randomized signals for which the transmission efficiency coefficient is greater than the transmission efficiency coefficient of the randomized signals is carried out by performing a predetermined number P of sub-iterations.

According to an embodiment, the sub-iterative modifying of the electrical signals corresponding to the frequencies for which the transmission efficiency coefficient is less than the predetermined threshold value is carried out by multiplying the initial amplitude and initial phase of each electrical signal by corresponding two modified random numbers.

According to an embodiment, said two modified random numbers are generated by sub-iteratively adding $\pm\Delta\beta_1 \cdot p$ and $\pm\Delta\beta_2 \cdot p$ to the two random numbers, correspondingly, where $p=1, 2, \ldots, P$.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
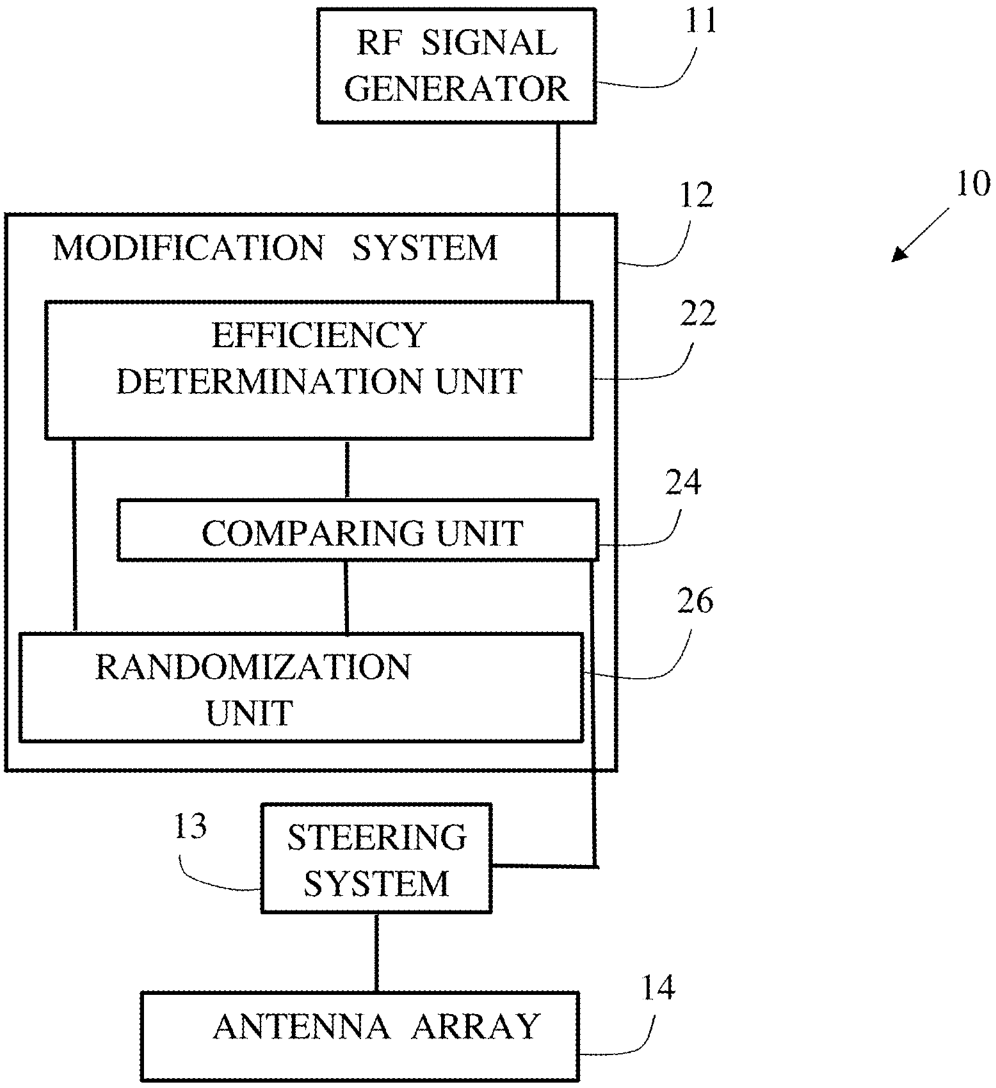
FIG. 1 illustrates a schematic block diagram of a transmission system configured for transmitting RF radiation in a predetermined direction at a sequence of K frequencies within a predetermined frequency band, according to an embodiment of the present invention.

The principles and operation of the transmission system and method for transmitting RF radiation in a predetermined direction at a sequence of K frequencies within a predetermined frequency band according to the present invention may be better understood with reference to the drawings and the accompanying description, it being understood that these drawings and examples in the description are given for illustrative purposes only and are not meant to be limiting. The same reference Roman numerals and alphabetic characters will be utilized for identifying those components which are common in the transmission system and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow hereinbelow, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Unless specifically stated otherwise, throughout the description, utilizing terms such as "computing" or "calculating" or "determining" or "obtaining" or the like, refer to the action and processes of a computer system, or similar electronic processing device, that manipulates and transforms data.

Referring to FIG. 1, a schematic block diagram of a transmission system 10 for transmitting radio frequency (RF) radiation in a predetermined direction at a sequence of K frequencies within a predetermined frequency band is illustrated, according to an embodiment of the present invention.

The transmission system 10 includes an RF generator 11, a modification system 12 arranged downstream of the RF signal generator 11, a steering system 13 arranged downstream of the modification system 12 and an antenna array 14 comprising a plurality of N antenna elements coupled to the steering system 13.

In the present application, an arrangement of one element downstream of another element implies electrical coupling of these elements to each other with a possibility to transfer electrical signals between the elements in the direction of the current associated with the transferring of the electrical signals.

The RF generator 11 is configured and operable for generating electrical signals through N transmission channels, corresponding to N antenna elements, for each frequency of the sequence of K frequencies $f_1, f_2, \ldots, f_K$ within the predetermined frequency band. The number N of the transmission channels is equal to the predetermined number of antenna elements in the antenna array 14. In other words, the RF generator 11 can generate electrical signals for each k-th frequency $f_k$ (where k=1, 2, . . . , K) of the sequence of K frequencies $f_1, f_2, \ldots, f_K$. Each electrical signal has a corresponding initial amplitude A and an initial phase φ.

For each transmission channel, electrical signals generated by the RF generator 11 for the k-th frequency $f_k$ can be represented by the expression $A_k e^{-j(2\pi \cdot f_k \cdot t + \varphi_k)}$, where $A_k$ is the initial amplitude of this signal, and $\varphi_k$ is the initial phase of this signal.

For N transmission channels for each k-th frequency $f_k$ of the sequence of K frequencies $f_1, f_2, \ldots, f_K$, the electrical signals can be represented by an initial excitation vector $V_k^{init}$ having N vector elements:

$$V_k^{init} = \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix}_k$$

The vector elements $A_n e^{j\varphi_n}$ (n=1, 2, . . . , N) relate to the corresponding electrical signals of the k-th frequency $f_k$ in the corresponding transmission channel. In particular, each vector element in the initial excitation vector $V_k^{init}$ includes the initial amplitude $A_n$ and initial phase $\varphi_n$ of the corresponding electrical signals for the k-th frequency $f_k$.

According to an embodiment, the modification system 12 is configured for receiving and processing the electrical signals corresponding to the N transmission channels for each k-th frequency $f_k$ from the RF signal generator 11. The modification system 12 is also configured for relaying optimal electrical signals associated with transmission efficiency coefficients greater than a predetermined threshold value to the steering system 13 as described hereinbelow. The optimal electrical signals include optimal unmodified signals provided by the RF signal generator 11 and optimal modified signals generated by the modification system 12 during operation, as also described hereinbelow.

In operation, the modification system 12 calculates a transmission efficiency coefficient $T_k$ of the transmission system 10 for each k-th frequency $f_k$ of the sequence of K frequencies $f_1, f_2, \ldots, f_K$ within the predetermined frequency band, and compares the transmission efficiency coefficient $T_k$ with a predetermined threshold value X. More specifically, the modification system 12 receives the corresponding excitation vector for each k-th frequency $f_k$ of the sequence of K frequencies $f_1, f_2, \ldots, f_K$, and utilizes the excitation vector for calculating the transmission efficiency coefficient $T_k$ of the transmission system 10 for each k-th frequency $f_k$ as described in further detail below.

According to an embodiment, the modification system 12 is also configured for separating electrical signals corresponding to the frequencies for which the transmission efficiency coefficient $T_k$ is less than the predetermined threshold value X from the electrical signals corresponding to the frequencies for which the transmission efficiency coefficient $T_k$ is equal to or greater than the predetermined threshold value X.

According to an embodiment, the modification system 12 is also configured for providing the electrical signals corresponding to the frequencies for which the transmission efficiency coefficient $T_k$ is equal to or greater than the predetermined threshold value X to the steering system 13. In other words, the modification system 12 provides the electrical signals through the N transmission channels for each frequency for which the transmission efficiency coefficient $T_k$ is equal to or greater than the predetermined threshold value X to the steering system 13. For example, the threshold value X can be in the range of 70%-90%.

Electrical signals having the initial amplitude and the initial phase received from the RF signal generator, which correspond to the frequencies for which the transmission efficiency coefficient $T_k$ is equal to or greater than the predetermined threshold X value and which are provided to the steering system 13 are referred to herein as "optimal unmodified signals".

According to an embodiment, the modification system 12 is configured to perform iterative modification of the electrical signals corresponding to the frequencies for which the transmission efficiency coefficient $T_k$ is less than the predetermined threshold value X. Specifically, in each iteration, the modification system 12 modifies these electrical signals by randomizing amplitude and phase of these electrical signals, thereby generating randomized signals. The modification system 12 is also configured for calculating updated transmission efficiency coefficient $T_{ran,k}$ for the randomized signals and for comparing this $T_{ran,k}$ with the predetermined threshold value X in each iteration. The iterative modification is performed until the transmission efficiency coefficient $T_k$ for these randomized signals is equal to or greater than the predetermined threshold value X. As a result of the iterative modification, the transmission efficiency coefficient $T_{ran,k}$ for the randomized signals is greater than the predetermined threshold value X.

It should be noted that null-points can occur at one or more frequencies within the sequence of K frequencies. The transmission efficiency coefficient $T_k$ for the electrical signals which correspond to these frequencies (at which null points can occur) is below the predetermined threshold value X. The modification system 12 receives and iteratively modifies these electrical signals until the transmission efficiency coefficient $T_k$ for these electrical signals is equal to or greater than the predetermined threshold value X. As a result of the iterative modification of these electrical signals, the null points are removed.

The randomized signals for which the transmission efficiency coefficient $T_{ran,k}$ is greater than the predetermined threshold value X are referred to herein as "optimal modified signals".

The modification system 12 is configured to relay optimal electrical signals, which include the optimal unmodified signals (obtained from the RF signal generator 11), and the optimal modified signals (obtained from the modification system 12) to the steering system 13.

According to an embodiment, the steering system 13 processes the optimal electrical signals and forms a steered beam of the RF radiation to the predetermined direction. The steering system 13 relays the electrical signals corresponding to the steered beam to the antenna array 14 for transmission.

According to an embodiment, the modification system 12 includes an efficiency determination unit 22, a comparing unit 24 arranged downstream of the efficiency determination unit 22, and a randomization unit 26 arranged downstream of the comparing unit 24.

According to an embodiment, the efficiency determination unit 22 is configured to receive the electrical signals for each k-th frequency $f_k$ of the sequence of K frequencies $f_1, f_2, \ldots, f_K$, to process these electrical signals, and to calculate for each k-th frequency $f_k$ the transmission efficiency coefficient $T_k$ of the transmission system 10. The transmission efficiency coefficient $T_k$ represents the amount of energy transmitted by the transmission system 10 for each k-th frequency $f_k$ of the sequence of K frequencies $f_1, f_2, \ldots, f_K$. More specifically, each k-th frequency $f_k$ has a corresponding transmission efficiency coefficient $T_k$ associated therewith.

According to an embodiment, the transmission efficiency coefficient $T_k$ can be calculated by:

$$T_k = \frac{E_{trans}}{E_{total}} \cdot 100\%, \tag{1}$$

where $E_{total}$ is the total energy of the electrical signals for the k-th frequency $f_k$ generated by the RF signal generator 11, and $E_{trans}$ is the energy transmitted by the transmission system 10 in operation for the k-th frequency $f_k$.

More specifically, $E_{trans}$ can be calculated by the efficiency determination unit 22 by using a relationship $E_{trans}=E_{total}\ E_{lost}$ where $E_{lost}$ is the energy that is lost by the transmission system 10 in operation for the k-th frequency $f_k$.

In particular, $E_{lost}$ is the energy that the transmission system 10 loses due to the mutual coupling between the antenna elements and the self-reflected energy of the antenna elements in the antenna array 14 when operating at the k-th frequency $f_k$.

According to an embodiment, the lost energy $E_{lost}$ of the transmission system 10 can be determined by taking into account the mutual coupling between the antenna elements, i.e., the amount of energy that each antenna element in the antenna array 14 receives from the neighboring antenna elements and the self-reflected energy of the antenna elements, and then summing the energies for all the antenna elements.

The mutual coupling between the antenna elements and the self-reflected energy of the antenna elements in the antenna array 14 are characterized by a coupling matrix S. For the antenna array 14 that includes N antenna elements, the coupling matrix S is a N×N matrix:

$$S = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_2} & \cdots s_{N_3} & \cdots & s_{N_N} \end{pmatrix}$$

Each non-diagonal coupling coefficient of the coupling matrix S represents the energy received by the corresponding antenna element from the neighboring antenna elements. For example, $s_{1_2}$ is the energy received by the $1^{st}$ antenna element from the $2^{nd}$ neighboring antenna element and, $s_{1_N}$ is the energy received by the $1^{st}$ antenna element from the n-th neighboring antenna element.

The coupling coefficients in the diagonal ($s_{1_1}, s_{2_2}, \ldots, s_{N_N}$) of the coupling matrix S represent the self-reflected energy of the antenna elements. For example, $s_{1_1}$ is the self-reflected energy of the $1^{st}$ antenna element and, $s_{N_N}$ is the self-reflected energy of the N-th antenna element.

Accordingly, for the antenna array 14 that includes N antenna elements, a combined energy $\tilde{s}_n$ that the n-th antenna element (n=1, 2, . . . , N) in the antenna array 14 receives from the neighboring antenna elements and the self-reflected energy of the n-th antenna element (for each antenna element) for each k-th frequency $f_k$ can be calculated by:

$$\begin{pmatrix} \tilde{s}_1 \\ \tilde{s}_2 \\ \tilde{s}_3 \\ \vdots \\ \tilde{s}_N \end{pmatrix} = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_2} & \cdots s_{N_3} & \cdots & s_{N_N} \end{pmatrix} \cdot \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix}, \tag{2}$$

Accordingly, the lost energy $E_{trans}$ can be calculated by:

$$E_{lost} = \sum_{n=1}^{N} |\tilde{s}|_n \tag{3}$$

Accordingly, the transmitted energy $E_{trans}$ of the transmission system 10 can be calculated by:

$$E_{trans} = E_{total} - E_{lost} = \sum_{n=1}^{N} \left| A_n e^{j\varphi_n} \right| - \sum_{n=1}^{N} |\tilde{s}|_n \tag{4}$$

As described above, the efficiency determination unit 22 can calculate the transmission efficiency coefficient $T_k$ using equation (1) by using the lost energy $E_{lost}$ and the transmitted energy $E_{trans}$ from equation (3) and (4) correspondingly.

According to an embodiment, the comparing unit 24 is configured for receiving the transmission efficiency coefficient $T_k$ for each k-th frequency $f_k$ from the efficiency determination unit 22. Then, the transmission efficiency coefficient $T_k$ is compared with the predetermined threshold value X. Further, the comparing unit 24 separates the electrical signals corresponding to the frequencies for which the transmission efficiency coefficient $T_k$ is less than the predetermined threshold value X from the electrical signals corresponding to the frequencies for which the transmission efficiency coefficient $T_k$ is equal to or greater than the predetermined threshold value X. Then, the comparing unit 24 provides the electrical signals corresponding to the frequencies for which the transmission efficiency coefficient $T_k$ is equal to or greater than the predetermined threshold value X to the steering system 13. In turn, the electrical signals corresponding to the frequencies for which the transmission efficiency coefficient $T_k$ is less than the predetermined threshold value X are relayed to the randomization unit 26.

The randomization unit 26 is configured for receiving the electrical signals corresponding to the frequencies for which the transmission efficiency coefficient $T_k$ is less than the predetermined threshold value X and for iteratively modifying these electrical signals.

In particular, the randomization unit 26 is configured for receiving electrical signals for each frequency for which the transmission efficiency coefficient $T_k$ is less than the predetermined threshold value X and for iteratively modifying these electrical signals by modifying their initial excitation vector $V_k^{init}$ in each iteration.

In each iteration, the modification of each electrical signal is performed by randomizing the amplitude and phase of each electrical signal, thereby generating randomized signals. More specifically, modification of the electrical signals is performed by randomizing the amplitude and phase of each vector element in the initial excitation vector $V_k^{init}$ of the electrical signals for each frequency at which the transmission efficiency coefficient $T_k$ is less than a predetermined threshold value X.

According to an embodiment, the randomization is carried out by generating two random numbers $\alpha_1$ and $\alpha_2$, each in the interval [0, 1], and multiplying these two random numbers $\alpha_1$ and $\alpha_2$ by the initial amplitude $A_k$ and initial phase $\varphi_k$ correspondingly. As a result of multiplying the modified random number $\alpha_1$ and $\alpha_2$ by the initial amplitudes and initial phases of the electrical signals, randomized signals are obtained. Each randomized signal has a corresponding randomized phase $\varphi_{ran}$ and a randomized amplitude $A_{ran}$. It should be noted that, for each k-th frequency, the two random numbers $\alpha_1$ and $\alpha_2$ can be different for each electrical signal in the n-th transmission channel (n=1, 2, . . . , N).

According to an embodiment, the randomized signals for the k-th frequency $f_k$ are represented by a randomized excitation vector $V_k^{ran}$:

$$V_k^{ran} = \begin{pmatrix} A_{ran,1} e^{j\varphi_{ran,1}} \\ A_{ran,2} e^{j\varphi_{ran,2}} \\ A_{ran,3} e^{j\varphi_{ran,3}} \\ \vdots \\ A_{ran,N} e^{j\varphi_{ran,N}} \end{pmatrix}_k,$$

The randomization unit 26 is also configured for providing, in each iteration, the randomized excitation vector $V_k^{ran}$ to the efficiency determination unit 22 for calculating an updated transmission efficiency coefficient $T_{ran,k}$ for the randomized signals. This updated transmission efficiency coefficient $T_{ran,k}$ is provided to the comparing unit 24 and compared with the predetermined threshold value X in each iteration. The randomized signals are provided by the comparing unit 24 to the steering system 13 when this transmission efficiency coefficient $T_{ran,k}$ is equal to or greater than the predetermined threshold value X.

In turn, when the transmission efficiency coefficient $T_{k,ran}$ for these randomized signals is less than the predetermined threshold value X, the modification system 12 performs a further iteration. The iterative modification is performed until the transmission efficiency coefficient $T_{k,ran}$ for the randomized signals is equal to or greater than the predetermined threshold value X. In other words, the electrical signals are iteratively modified by the modification system 12 until the transmission efficiency coefficient $T_{k,ran}$ is equal to or greater than the predetermined threshold value X.

As mentioned above, the randomized signals for which the transmission efficiency coefficient $T_{ran,k}$ is greater than the predetermined threshold value X are referred to herein as "optimal modified signals".

As mentioned above, null-points can occur at one or more frequencies within the sequence of K frequencies. The transmission efficiency coefficient $T_k$ for the electrical signals which correspond to the frequencies at which null points may appear, is below the predetermined threshold value X. The modification system 12 receives and iteratively modifies these electrical signals until the transmission efficiency coefficient $T_k$ for these electrical signals is equal to or greater than the predetermined threshold value X. As a result of the iterative modification of these electrical signals, the null points are removed.

According to an embodiment, the steering system 13 is configured for receiving the optimal electrical signals including the optimal modified signals and the optimal unmodified signals obtained from the modification system 12. The steering system 13 processes the optimal electrical signals to generate steering electrical signals related to the optimal electrical signals. The steering electrical signals are provided to the antenna array 14 via the N transmission channels to form a steered beam for transmission in the predetermined direction.

Figure 2:
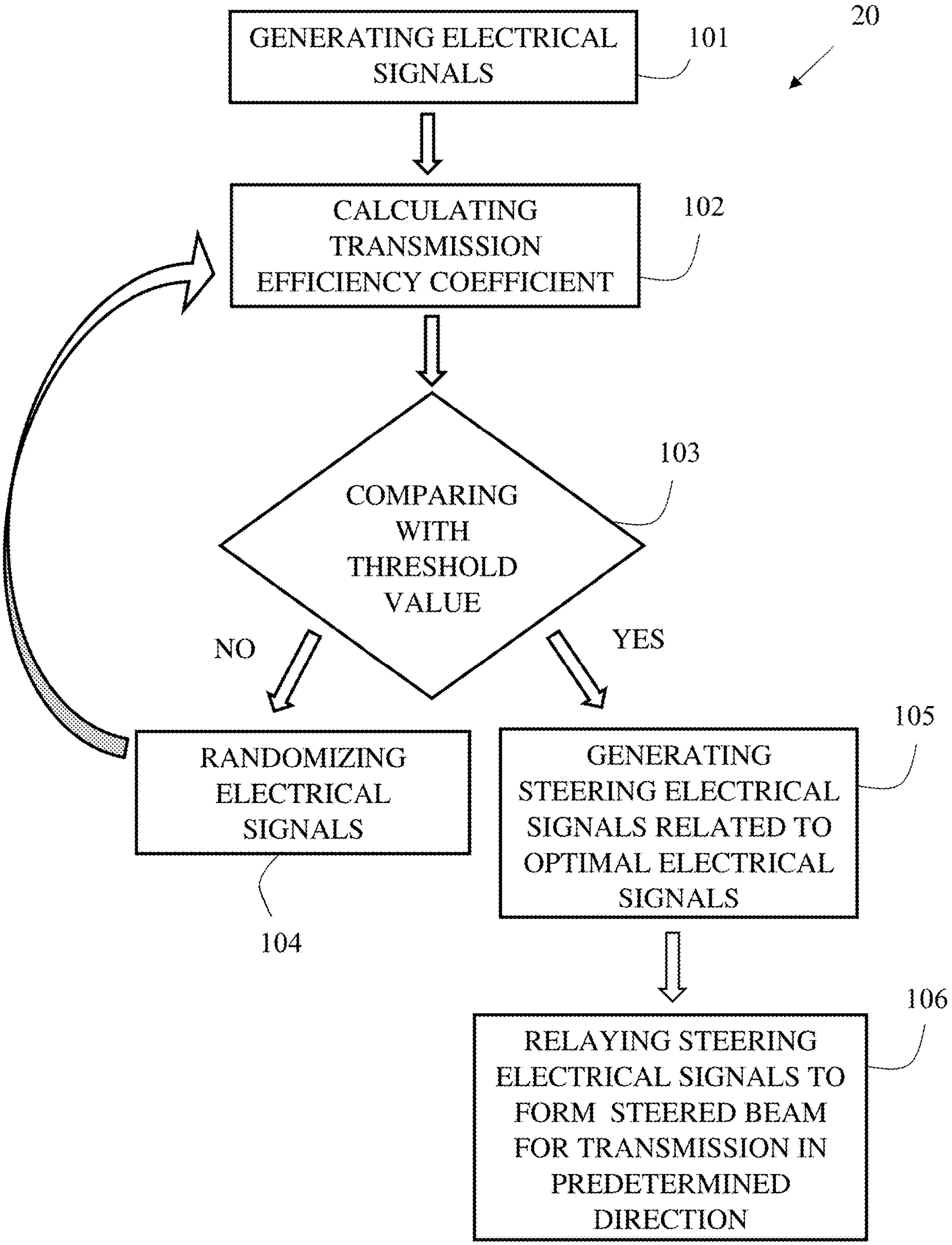
FIG. 2 illustrates a schematic flow-chart diagram of a method of operation of a transmission system in FIG. 1, according to an embodiment of the present invention.

Referring to FIG. 2, a flow chart diagram of a method 20 for transmitting radio frequency (RF) radiation in a predetermined direction at a sequence of K frequencies within a predetermined frequency band by using the transmission system 10 in FIG. 1 is illustrated, according to an embodiment of the present invention.

Referring to FIGS. 1 and 2 together, in operation of the transmission system 10, electrical signals for each frequency of the sequence of K frequencies $f_1, f_2, \ldots, f_K$ within the predetermined frequency band are generated (block 101). For each transmission channel, the electrical signals of the k-th frequency $f_k$ can be represented by the expression $A_k e^{-j(2\pi \cdot f_k \cdot t + \varphi_k)}$, where $A_k$ is the initial amplitude of this signal, $\varphi_k$ is the initial phase of this signal.

For each k-th frequency $f_k$ of the sequence of K frequencies $f_1, f_2, \ldots, f_K$, the electrical signals can be represented by an initial excitation vector $V_k^{init}$ having N vector elements corresponding to the N transmission channels:

$$V_k^{init} = \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix}_k$$

The vector elements $A_n e^{j\varphi_n}$ (n=1, 2, . . . , N) relate to the corresponding electrical signals of the k-th frequency $f_k$. In particular, each vector element in the initial excitation vector $V_k^{init}$ includes the initial amplitude $A_n$ and initial phase $\varphi_n$ of the corresponding electrical signals for the k-th frequency $f_k$.

The method further includes processing the electrical signals and calculating (block 102) a transmission efficiency coefficient $T_k$ for each k-th frequency $f_k$ of the sequence of K frequencies $f_1, f_2, \ldots, f_K$ within the predetermined frequency band.

According to an embodiment, the transmission efficiency coefficient $T_k$ can be calculated by $$T_k = \frac{E_{trans}}{E_{total}} \cdot 100\%, \quad (5)$$

where $E_{total}$ is the total energy of the electrical signals for the k-th frequency $f_k$ generated by the RF signal generator 11, and $E_{trans}$ is the energy transmitted by the transmission system 10 in operation for the k-th frequency $f_k$.

More specifically, $E_{trans}$ can be calculated by the efficiency determination unit 22 by $E_{trans}=E_{total}-E_{lost}$ where $E_{lost}$ is the energy that is lost by the transmission system 10 in operation for the k-th frequency $f_k$. In this case, $E_{lost}$ is the energy that the transmission system 10 loses due to the mutual coupling between the antenna elements and the self-reflected energy of the antenna elements in the antenna array 14 when the transmission system 10 operates at the k-th frequency $f_k$.

According to an embodiment, the lost energy $E_{lost}$ of the transmission system 10 can be determined by taking into account the mutual coupling between the antenna elements, i.e., the amount of energy that each antenna element in the antenna array 14 receives from the neighboring antenna elements and the self-reflected energy of the antenna elements, and then summing the energies for all the antenna elements.

The mutual coupling between the antenna elements and the self-reflected energy of the antenna elements in the antenna array 14 are characterized by a coupling matrix S. For an antenna array 14 that includes N antenna elements the coupling matrix S is a N×N matrix:

$$S = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_2} & \cdots s_{N_3} & \cdots & s_{N_N} \end{pmatrix}$$

Each non-diagonal coupling coefficient of the coupling matrix S represents the energy received by the corresponding antenna element from the neighboring antenna elements. For example, $s_{12}$ is the energy received by the $1^{st}$ antenna element from the $2^{nd}$ neighboring antenna element and, $s_{1_N}$ is the energy received by the $1^{st}$ antenna element from the n-th neighboring antenna element.

The coupling coefficients in the diagonal ($s_{1_1}, s_{2_2}, \ldots, s_{N_N}$) of the coupling matrix S represent the self-reflected energy of the antenna elements. For example, $s_{11}$ is the self-reflected energy of the $1^{st}$ antenna element and, $s_{N_N}$ is the self-reflected energy of the N-th antenna element.

Accordingly, for an antenna array 14 that includes N antenna elements, a combined energy $\tilde{s}_n$ that the n-th antenna element (n=1, 2, . . . , N) in the antenna array 14 receives from the neighboring antenna elements and the reflected energy of the n-th antenna element itself (for each antenna element) for each k-th frequency $f_k$ can be calculated by:

$$\begin{pmatrix} \tilde{s}_1 \\ \tilde{s}_2 \\ \tilde{s}_3 \\ \vdots \\ \tilde{s}_N \end{pmatrix} = \begin{pmatrix} s_{1_1} & S_{1_2} & s_{1_3} & \cdots & s_{1_N} \\ s_{2_1} & S_{2_2} & s_{2_3} & \cdots & s_{2_N} \\ s_{3_1} & S_{3_2} & s_{3_3} & \cdots & s_{3_N} \\ \vdots & \vdots & \vdots & \ddots & \vdots \\ s_{N_1} & s_{N_2} & \cdots s_{N_3} & \cdots & s_{N_N} \end{pmatrix} \cdot \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix}, \quad (2)$$

Accordingly, the lost energy $E_{lost}$ can be calculated by:

$$E_{lost} = \sum_{n=1}^{N} |\tilde{s}|_n, \quad (3)$$

where $|\tilde{s}|_n$ is the energy received by the n-th antenna element from the neighboring elements and N is the number of antenna elements in the antenna array 14.

Accordingly, the transmitted energy $E_{trans}$ of the transmission system 10 can be calculated as follows:

$$E_{trans} = E_{total} - E_{lost} = \sum\nolimits_{n=1}^{N} |A_n e^{j\varphi_n}| - \sum\nolimits_{n=1}^{N} |\tilde{s}|_n \quad (4)$$

As described above, the efficiency determination unit 22 can calculate the transmission efficiency coefficient $T_k$ using equation (1) by using the lost energy $E_{lost}$ and the transmitted energy $E_{trans}$ from equations (3) and (4) correspondingly.

The method also includes comparing the transmission efficiency coefficient $T_k$ (block 103) for each k-th frequency $f_k$ with a predetermined threshold value X. Then, electrical signals corresponding to the frequencies for which the transmission efficiency coefficient $T_k$ is less than the predetermined threshold value X are separated from the electrical signals corresponding to the frequencies for which the transmission efficiency coefficient $T_k$ is equal to or greater than the predetermined threshold value X.

The method also includes providing optimal unmodified signals, which are the electrical signals (block 104) corresponding to the frequencies for which the transmission efficiency coefficient $T_k$ is equal to or greater than the predetermined threshold value X, to the steering system 13. For example, the threshold value X can be in the range of 70%-90%.

According to an embodiment, the method also includes performing iterative modification of the electrical signals corresponding to the frequencies for which the transmission efficiency coefficient is less than the predetermined threshold value X.

In the iterative modification, the electrical signals corresponding to the frequencies for which the transmission efficiency coefficient is less than the predetermined threshold value X are modified (block 105) by modifying the initial excitation vector $V_k^{init}$ for these electrical signals.

According to an embodiment, in each iteration, the modification of such electrical signals is performed by randomizing the corresponding amplitudes and phases of these electrical signals, thereby generating randomized signals. More specifically, the modification of the electrical signals is performed by randomizing amplitude and phase of each vector element in the initial excitation vector $V_k^{init}$ of the electrical signals for each frequency $f_k$ for which the transmission efficiency coefficient $T_k$ is less than a predetermined threshold value X.

According to an embodiment, the randomization is carried out by generating two random numbers $\alpha_1$ and $\alpha_2$, each in the interval [0, 1], and multiplying these two random numbers $\alpha_1$ and $\alpha_2$ by the initial amplitude $A_k$ and initial phase $\varphi_k$ correspondingly. As a result of multiplying the modified random number $\alpha_1$ and $\alpha_2$ by the initial amplitudes and initial phases of the electrical signals, randomized signals are obtained. Each randomized signal has a corresponding randomized phase $(N_{an}$ and a randomized amplitude $A_{ran}$. It should be noted that, for each k-th frequency the two random numbers $\alpha_1$ and $\alpha_2$ can be different for each electrical signal in the n-th transmission channel (n=1, 2, . . . , N).

According to an embodiment, the randomized signals for the k-th frequency $f_k$ are represented by a randomized excitation vector $V_k^{ran}$:

$$V_k^{ran} = \begin{pmatrix} A_{ran,1} e^{j\varphi_{ran,1}} \\ A_{ran,2} e^{j\varphi_{ran,2}} \\ A_{ran,3} e^{j\varphi_{ran,3}} \\ \vdots \\ A_{ran,N} e^{j\varphi_{ran,N}} \end{pmatrix}_k,$$

As shown in FIG. 2, the iterative modification also includes calculating a transmission efficiency coefficient $T_{ran,k}$ for the randomized signals, as described above, mutatis mutandis.

Further, the transmission efficiency coefficient $T_{ran,k}$ for the randomized signals is compared with the predetermined threshold value X in each iteration. When this transmission efficiency coefficient $T_k$ is equal to or greater than the predetermined threshold value X, these randomized signals, which are the optimal modified signals, are provided to the steering system 13. In turn, when the transmission efficiency coefficient $T_k$ for the randomized signals is less than the predetermined threshold value X, a further iteration is performed. The iterative modification is performed until the transmission efficiency coefficient $T_{ran,k}$ for the randomized signals is equal to or greater than the predetermined threshold value X. In other words, in the iterative modification, the electrical signals are modified until the transmission efficiency coefficient $T_{ran,k}$ is equal to or greater than the predetermined threshold value X.

It should be noted that null-points can occur at one or more frequencies within the sequence of K frequencies. The transmission efficiency coefficient $T_k$ for the electrical signals which correspond to these frequencies (at which null points can occur) is below the predetermined threshold value X. These electrical signals are iteratively modified until the transmission efficiency coefficient $T_k$ for these electrical signals is equal to or greater than the predetermined threshold value X. As a result of the iterative modification of these electrical signals, the null points are removed.

The method further includes generating the optimal electrical signals, which include the optimal modified signals and the optimal unmodified signals, and providing these optimal electrical signals to the steering system 13 to generate steering electrical signals related to the optimal electrical signals.

The method further includes providing the steering electrical signals via the N transmission channels to the antenna array 14 to form a steered beam for transmission in the predetermined direction.

Figure 3:
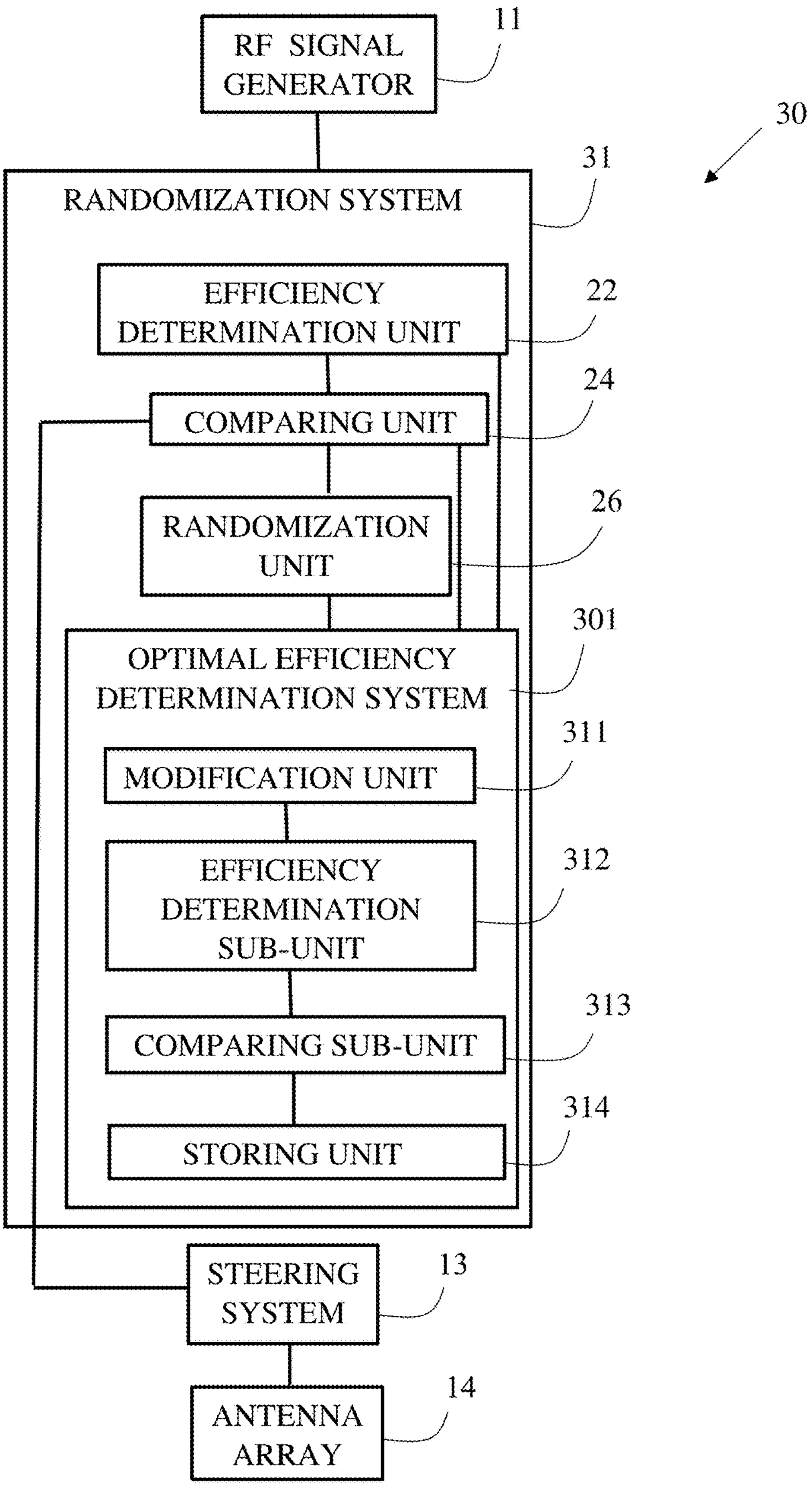
FIG. 3 illustrates a schematic block diagram of a transmission system configured for transmitting RF radiation in a predetermined direction at a sequence of K frequencies within a predetermined frequency band, according to another embodiment of the present invention.

Referring to FIG. 3, a schematic block diagram of a transmission system 30 for transmitting radio frequency (RF) radiation in a predetermined direction at a sequence of K frequencies within a predetermined frequency band is illustrated, according to another embodiment of the present invention. The transmission system 30 includes an RF generator 11, a modification system 31 arranged downstream of the RF signal generator 11, a steering system 13 arranged downstream of the modification system 31 and the antenna array 14 comprising a plurality of N antenna elements coupled to the steering system 13.

As described above, the RF generator 11 is configured and operable for generating electrical signals through N transmission channels (corresponding to N antenna elements in the antenna array 14) for each frequency of the sequence of K frequencies $f_1, f_2, \ldots, f_K$ within the predetermined frequency band.

The modification system 31 is configured for receiving the electrical signals from the RF generator 11, processing these electrical signals, and obtaining optimal electrical signals having transmission efficiency coefficients greater than a predetermined threshold value X. The optimal electrical signals are relayed to the steering system 31 as described hereinbelow. The optimal electrical signals include the optimal unmodified signals provided by the RF signal generator 11 and the optimal modified signals generated by the modification system 31 during operation, as described hereinbelow.

As described above, the electrical signals having the initial amplitude and initial phase, which correspond to the frequencies for which the transmission efficiency coefficient $T_k$ is equal to or greater than the predetermined threshold X value and which are provided to the steering system 13 are referred to herein as "optimal unmodified signals".

According to this embodiment, the modification system 31 includes an efficiency determination unit 22, a comparing unit 24 arranged downstream of the efficiency determination unit 22, and a randomization unit 26 arranged downstream of the comparing unit 24.

As can be seen in FIG. 3, the modification system 31 differs from the modification system (12 in FIG. 1) in the fact that the randomization system 31 also includes an optimal efficiency determination system 310 arranged downstream of the randomization unit 26 and coupled to the comparing unit 24 and the efficiency determination unit 22.

According to an embodiment, the optimal efficiency determination system 310 is configured for modifying the two random numbers $\alpha_1$ and $\alpha_2$ and for generating modified randomized signals for which the transmission efficiency coefficient $T_{mod,k}$ is greater than the transmission efficiency coefficient $T_{ran,k}$ of the randomized signals. The generating of the modified randomized signals is carried out by using two modified random numbers. These modified randomized signals are obtained by the optimal efficiency determination system 310 by performing a predetermined number P of sub-iterations as described below in detail.

According to an embodiment, the efficiency determination unit 22 is configured to receive the electrical signals for each k-th frequency $f_k$ of the sequence of K frequencies $f_1, f_2, \ldots, f_K$, to process these electrical signals and to calculate for each k-th frequency $f_k$ the transmission efficiency coefficient $T_k$ of the transmission system 30 as described above, mutatis mutandis.

According to an embodiment, the comparing unit 24 is configured for receiving the transmission efficiency coefficient $T_k$ for each k-th frequency $f_k$ from the efficiency determination unit 22. Then, the transmission efficiency coefficient $T_k$ is compared with the predetermined threshold value X. Further, the comparing unit 24 separates the electrical signals corresponding to the frequencies for which the transmission efficiency coefficient $T_k$ is less than the predetermined threshold value X from the electrical signals corresponding to the frequencies for which the transmission efficiency coefficient $T_k$ is equal to or greater than the predetermined threshold value X. Then, the comparing unit 24 provides the electrical signals corresponding to the frequencies for which the transmission efficiency coefficient $T_k$ is equal to or greater than the predetermined threshold value X to the steering system 13. In turn, the electrical signals corresponding to the frequencies for which the transmission efficiency coefficient $T_k$ is less than the predetermined threshold value X are relayed to the randomization unit 26. The randomization unit 26 is configured for receiving the electrical signals corresponding to the frequencies for which the transmission efficiency coefficient $T_k$ is less than the predetermined threshold value X from the comparing unit 24. The randomization unit 26 is also configured for iteratively modifying the electrical signals, thereby generating randomized signals.

As described above, with reference to FIG. 1, the randomization unit 26 is configured for receiving electrical signals for the frequencies for which the transmission efficiency coefficient $T_k$ is less than the predetermined threshold value X, and for iteratively modifying these electrical signals by modifying their initial excitation vector $V_k^{init}$. In each iteration, the modification of each electrical signal is performed by randomizing the amplitude and phase of each electrical signal, thereby generating the randomized signals. More specifically, the modification of the electrical signals is performed by randomizing amplitude and phase of each vector element in the initial excitation vector $V_k^{init}$ of the electrical signals for each frequency at which the transmission efficiency coefficient $T_k$ is less than a predetermined threshold value X.

According to an embodiment, the randomization of the amplitude and phase of each vector element in the initial excitation vector $V_k^{init}$ carried out by generating two random numbers $\alpha_1$ and $\alpha_2$, each in the interval [0, 1], and multiplying these two random numbers $\alpha_1$ and $\alpha_2$ by the initial amplitude $A_k$ and initial phase $\varphi_k$ correspondingly. As a result of multiplying the modified random number $\alpha_1$ and $\alpha_2$ by the initial amplitudes and initial phases of the electrical signals, randomized signals are obtained. Each randomized signal has a corresponding randomized phase $\varphi_{ran}$ and a randomized amplitude $A_{ran}$. It should be noted that for each k-th frequency, the two random numbers $\alpha_1$ and $\alpha_2$ can be different for each electrical signal in the n-th transmission channel (n=1, 2, . . . , N). According to an embodiment, the randomized signals for the k-th frequency $f_k$ are represented by a randomized excitation vector $V_k^{ran}$:

$$V_k^{ran} = \begin{pmatrix} A_{ran,1}e^{j\varphi_{ran,1}} \\ A_{ran,2}e^{j\varphi_{ran,2}} \\ A_{ran,3}e^{j\varphi_{ran,3}} \\ \vdots \\ A_{ran,N}e^{j\varphi_{ran,N}} \end{pmatrix}_k,$$

The randomization unit 26 is also configured for providing, in each iteration, the randomized excitation vectors to the efficiency determination unit 22 for calculating an updated transmission efficiency coefficient $T_{ran,k}$.

According to this embodiment, this updated transmission efficiency coefficient $T_{ran,k}$ is relayed by the efficiency determination unit 22 to the optimal efficiency determination system 310 in each iteration of the modification system 31.

According to an embodiment, the optimal efficiency determination system 310 is configured for receiving in each iteration of the modification system 31 the electrical signals for which the transmission efficiency coefficient $T_k$ is less than the predetermined threshold value X from the comparing unit 24. The optimal efficiency determination system 310 also receives the two random numbers $\alpha_1$ and $\alpha_2$ for each transmission channel from the randomization unit 26 and the corresponding updated transmission efficiency coefficient $T_{ran,k}$ for the randomized signals from the efficiency determination unit 22.

According to an embodiment, the optimal efficiency determination system 310 includes a modification unit 311, an efficiency determination sub-unit 312 arranged downstream of the modification unit 311, a comparing sub-unit 314 arranged downstream of the efficiency determination sub-unit 312, and a storing unit 313 coupled to the comparing sub-unit 314.

According to an embodiment, the modification unit 311 is configured, in each sub-iteration p (where p is sub-iteration number p=1, 2, . . . , P), for receiving the electrical signals for which the transmission efficiency coefficient $T_k$ is less than the predetermined threshold value X from the comparing unit 24 and the corresponding two random numbers $\alpha_1$ and $\alpha_2$ for each electrical signal from the randomization unit 26, and for modifying these electrical signals, thereby generating modified randomized signals.

According to an embodiment, the modification of these electrical signals is carried out by modifying the initial amplitudes and initial phases of these electrical signals. More specifically, the modification of these electrical signals is performed by modifying the initial amplitude and initial phase of each vector element in the initial excitation vector $V_k^{init}$ of these electrical signals.

According to an embodiment, the modification of the amplitudes and phases of the electrical signals is carried out by multiplying the initial amplitude and initial phase of each electrical signal by the corresponding two modified random numbers $\alpha_{1mod}$ and $\alpha_{2mod}$.

According to an embodiment, the two modified random numbers $\alpha_{1mod}$ and $\alpha_{2mod}$ are the numbers in the proximity of the two random numbers $\alpha_1$ and $\alpha_2$. The two modified random numbers $\alpha_{1mod}$ and $\alpha_{2mod}$ are generated by sub-iteratively modifying the values of the two random numbers $\alpha_1$ and $\alpha_2$ (i.e., modifying the two random numbers $\alpha_1$ and $\alpha_2$ in each sub-iteration p).

According to an embodiment, modification of the two random numbers $\alpha_1$ and $\alpha_2$ is carried out by sub-iteratively adding $\pm\Delta\beta_1 \cdot p$ and $\pm\Delta\beta_2 \cdot p$ (p=1, 2, . . . , P) to the two random numbers $\alpha_1$ and $\alpha_2$, correspondingly. The proximity increments $\Delta\beta_1$ and $\Delta\beta_2$ can, for example, be in the range of 0.01-0.001. Accordingly, in each sub-iteration p, $\alpha_{1mod,p}=\alpha_1\pm\Delta\beta_1 \cdot p$ and $\alpha_{2mod,p}=\alpha_2\pm\Delta\beta_2 \cdot p$. The number of sub-iterations P can, for example, be in the range of 500-1000.

For example, when in the first sub-iteration (p=1) $\Delta\beta_1=0.001$ and $\Delta\beta_2=0.003$, the two modified random numbers can be $\alpha_{1mod,1}=\alpha_1+0.001.1$ and $\alpha_{2mod,1}=\alpha_2+0.003\cdot 1$. Accordingly, in the second sub-iteration (p=2) $\alpha_{1mod,2}=\alpha_1+0.001\cdot 2$ and $\alpha_{2mod,2}=\alpha_2 0.003\cdot 2$.

As a result of multiplying the two modified random numbers $\alpha_{1mod}$ and $\alpha_{2mod}$ by the initial amplitudes and initial phases of the electrical signals, modified randomized signals are obtained. As a result of the modification sub-iterative procedure, for each transmission channel n (where n=1, 2, . . . , N), each modified randomized signal has a corresponding modified randomized phase $(\varphi_{mod})_p$ and a modified randomized amplitude $(A_{mod})_p$.

According to an embodiment, in each sub-iteration p, the modified randomized signals for the k-th frequency $f_k$ are represented by a modified excitation vector $V_k^{mod}$:

$$V_k^{mod} = \begin{pmatrix} A_{mod,1}e^{j\varphi_{mod,1}} \\ A_{mod,2}e^{j\varphi_{mod,2}} \\ A_{mod,3}e^{j\varphi_{mod,3}} \\ \vdots \\ A_{mod,N}e^{j\varphi_{mod,N}} \end{pmatrix}_k,$$

The modification unit 311 is also configured for relaying these modified randomized signals to the sub efficiency determination unit 312 in each sub-iteration p.

According to an embodiment, in each sub-iteration p, the efficiency determination sub-unit 312 is configured for receiving the modified randomized signals from the modification unit 311, and for calculating the transmission efficiency coefficient $T_{mod,k}$ for these modified randomized signals as described above, mutatis mutandis.

Thus, in each sub-iteration of the optimal efficiency determination system 310 the electrical signals are modified and transmission efficiency coefficient $T_{mod,k}$ is calculated for the modified randomized signals, as described above.

According to an embodiment, the storing unit 313 is configured for storing the transmission efficiency coefficient $T_{mod,k}$ and the corresponding excitation vector $V_k^{mod}$ of the modified randomized signals received from the efficiency determination sub-unit 312, and the transmission efficiency coefficient $T_{ran,k}$ of the randomized signals, and the corresponding randomized vector $V_k^{ran}$ obtained from the efficiency determination unit 22.

The transmission efficiency coefficient $T_{ran,k}$ (or $T_{mod,k}$) stored in the storing unit 313 is referred to herein as "stored efficiency coefficient", and the corresponding excitation vector $V_k^{ran}$ (or $V_k^{mod}$) is referred to herein as "stored excitation vector".

In operation, for each sub-iteration p, the comparing sub-unit 314 is configured for receiving the stored coefficient from the storing unit 313 and the transmission efficiency coefficient $T_{mod,k}$ of the modified randomized signals from the efficiency determination sub-unit 312. The comparing sub-unit 314 is also configured for comparing the value of the stored efficiency coefficient with the current value of the transmission efficiency coefficient $T_{mod,k}$ of the modified randomized signals. The comparing sub-unit 314 is also configured for providing the transmission efficiency coefficient $T_{mod,k}$ of the modified randomized signals and the corresponding excitation vector $V_k^{mod}$ to the storing unit 313 for storing thereof when in a certain sub-iteration p the value of this transmission efficiency coefficient $T_{mod,k}$ is greater than the value of stored efficiency coefficient.

More specifically, the stored efficiency coefficient and the stored excitation vector in the storing unit 313 are replaced with the transmission efficiency coefficient $T_{mod,k}$ and the corresponding excitation vector $V_k^{mod}$ when the value of this transmission efficiency coefficient $T_{mod,k}$ is greater than the value of the stored efficiency coefficient. Alternatively, when the value of this transmission efficiency coefficient $T_{mod,k}$ is equal to or less than the value of the stored efficiency coefficient, the stored efficiency coefficient remains unchanged.

It should be understood that in the first sub-iteration (p=1), the storing unit 313 receives the transmission efficiency coefficient $T_{ran,k}$ of the randomized signals and the corresponding excitation vector $V_k^{ran}$ for storing. In other words, the stored efficiency coefficient in the first sub-iteration is the transmission efficiency coefficient $T_{ran,k}$ of the randomized signals and the stored excitation vector is the corresponding excitation vector $V_k^{ran}$.

Accordingly, in the first sub-iteration, the comparing sub-unit 314 compares the value of the transmission efficiency coefficient $T_{ran,k}$ of the randomized signals with the value of the transmission efficiency coefficient $T_{mod,k}$ of the modified randomized signals.

This process is performed in each sub-iteration p of the optimal efficiency determination system 310. After completing the predetermined number P of sub-iterations, the storing unit 313 stores the highest value of the transmission efficiency coefficient $T_{ran,k}$ (or $T_{mod,k}$) from all the sub-iterations P and the excitation vector $V_k^{mod}$ (or $V_k^{ran}$) corresponding to this highest value of the transmission efficiency coefficient.

The stored efficiency coefficient, which is stored in the storing unit 313 after completing the predetermined number P of sub-iterations, is referred to herein as "highest transmission efficiency coefficient $T_h$", while the corresponding excitation vector is referred to herein as "optimal excitation vector $V_k^h$".

After completing the predetermined number P of sub-iterations, the storing unit 313 is also configured for providing the highest transmission efficiency coefficient $T_h$ to the comparing unit 24 for comparing this highest transmission efficiency coefficient $T_h$ with the predetermined threshold value X. The optimal excitation vector $V_k^h$, for which the highest transmission efficiency coefficient $T_h$ is equal to or greater than the predetermined threshold value X, represents the optimal modified signals.

The comparing unit 24 is also configured for relaying optimal electrical signals including the optimal modified signals and the optimal unmodified signals to the steering system 13.

In turn, when the highest transmission efficiency coefficient $T_h$ is less than the predetermined threshold value X, the modification system 31 continues its operation and performs a further iteration.

According to an embodiment, the steering system 13 is configured for receiving the optimal electrical signals obtained from the modification system 31, and for generating steering electrical signals related to the optimal electrical signals.

The steering electrical signals are provided to the antenna array 14 via the N transmission channels to form a steered beam for transmission in the predetermined direction.

Figure 4:
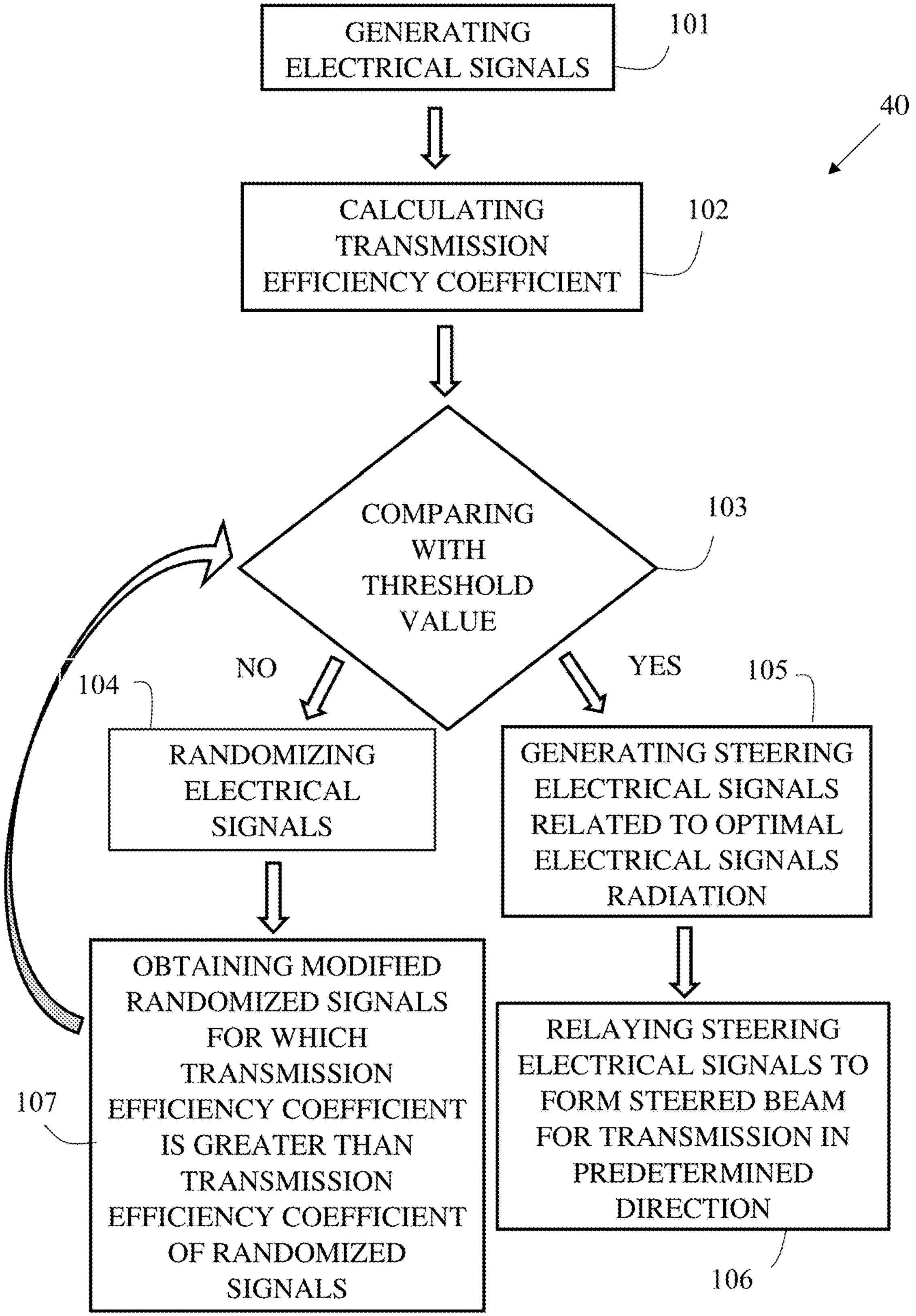
FIG. 4 illustrates a schematic flow-chart diagram of a method of operation of a transmission system in FIG. 3, according to an embodiment of the present invention.

Referring to FIG. 4, a flow chart diagram of a method 40 for transmitting radio frequency (RF) radiation in a predetermined direction at a sequence of K frequencies within a predetermined frequency band by using the transmission system 30 in FIG. 3 is illustrated, according to an embodiment of the present invention. The method 40 of operation of the transmission system 30 differs from the method (20 in FIG. 2) of operation of the transmission system 10 in the fact that it further includes a step of obtaining, by the optimal efficiency determination system 310, modified randomized signals for which the transmission efficiency coefficient $T_{mod,k}$ is greater than the transmission efficiency coefficient $T_{ran,k}$ of the randomized signals.

Figure 5:
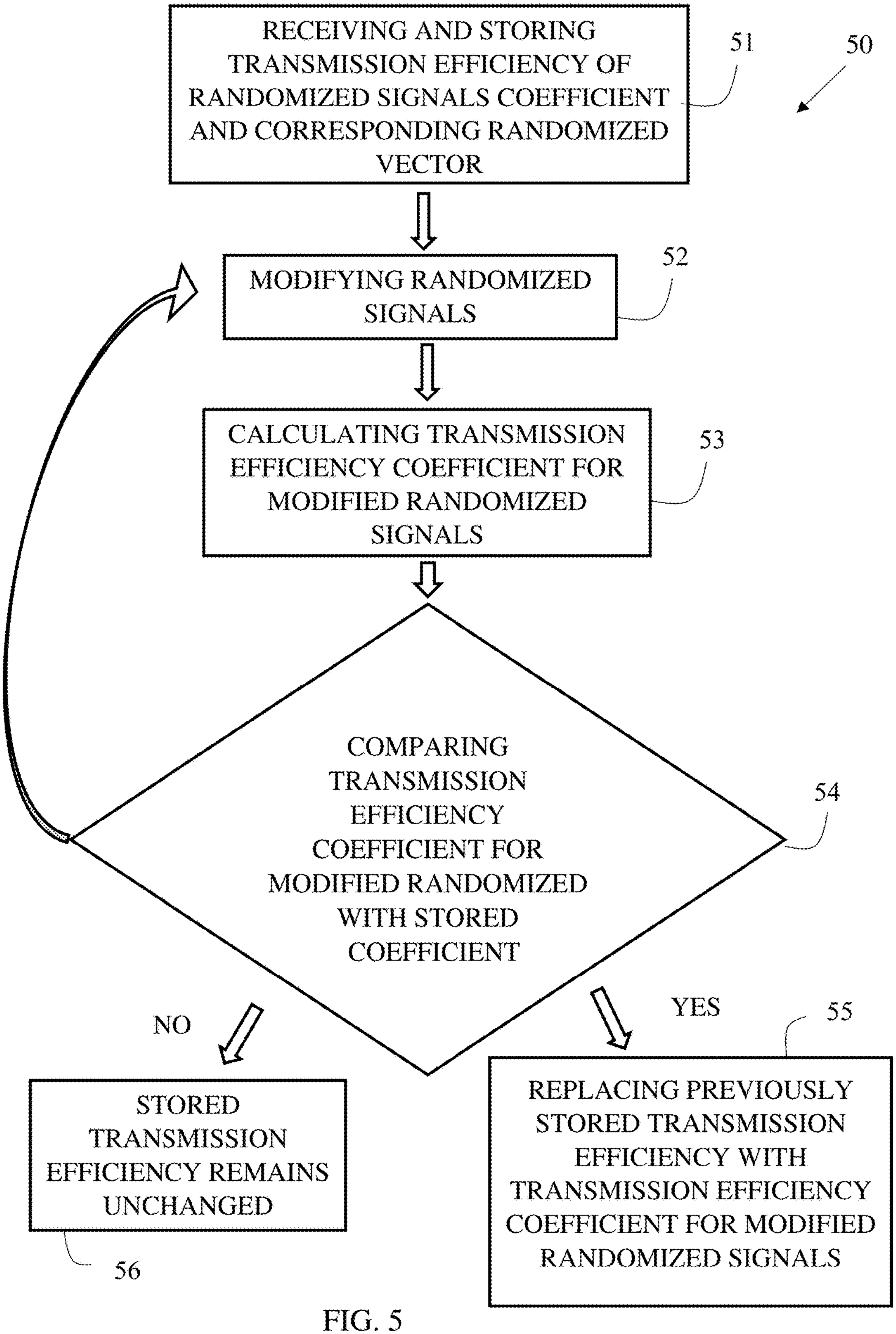
FIG. 5 illustrates a schematic flow-chart diagram of a method for providing modified randomized signals, according to an embodiment of the present invention.

Referring to FIG. 5, a flow chart diagram of a method 50 for providing the modified randomized signals for which the transmission efficiency coefficient $T_{mod,k}$ is greater than the transmission efficiency coefficient $T_{ran,k}$ of the randomized signals by the optimal efficiency determination system 310 in FIG. 3 is illustrated, according to an embodiment of the present invention.

According to this embodiment, the method 50 includes receiving and storing (block 51) the transmission efficiency coefficient $T_{ran,k}$ of the randomized signals and the corresponding randomized vector $V_k^{ran}$. The method further includes sub-iteratively modifying (block 52) the electrical signals for which the transmission efficiency coefficient is less than the predetermined threshold value X obtained from the RF generator 11. The modification of these electrical signals is carried out by modifying the initial amplitudes and initial phases of these electrical signals in each sub-iteration.

More specifically, the modification of these electrical signals is performed by modifying amplitude and phase of each vector element in the initial excitation vector $V_k^{init}$ of these electrical signals in each sub-iteration. The modification of the amplitudes and phases of the electrical signals is carried out by multiplying the initial amplitude and initial phase of each electrical signal by the corresponding two modified random numbers $\alpha_{1mod}$ and $\alpha_{2mod}$. The two modified random numbers $\alpha_{1mod}$ and $\alpha_{2mod}$ are the numbers in the proximity of the two random numbers $\alpha_1$ and $\alpha_2$.

According to an embodiment, the two modified random numbers $\alpha_{1mod}$ and $\alpha_{2mod}$ are generated by sub-iteratively modifying the values of the two random numbers $\alpha_1$ and $\alpha_2$ (i.e., modifying the random numbers $\alpha_1$ and $\alpha_2$ in each sub-iteration).

According to an embodiment, the modification of the two random numbers $\alpha_1$ and $\alpha_2$ is carried out by sub-iteratively adding $\pm\Delta\beta_1 \cdot p$ and $\pm\Delta\beta_2 \cdot p$ to the two random numbers $\alpha_1$ and $\alpha_2$, correspondingly, where p=1, 2, . . . , P, where P is the total number of sub-iterations. The proximity increments $\Delta\beta_1$ and $\Delta\beta_2$ can, for example, be in the range of 0.01-0.001. Accordingly, in each sub-iteration p, $\alpha_{1mod,p}=\alpha_1\pm\Delta\beta\cdot p$ and $\alpha_{2mod,p}=\alpha_2\pm\Delta\beta_2\cdot p$. The number of the sub-iterations P can, for example, be in the range of 500-1000.

For example, when in the first sub-iteration (p=1) $\Delta\beta_1=0.001$ and $\Delta\beta_2=0.003$, the modified two random numbers can be $\alpha_{1mod,1}=\alpha_1+0.001\cdot 1$ and $\alpha_{2mod,1}=\alpha_2+0.003\cdot 1$. Accordingly, in the second sub-iteration (p=2) $\alpha_{1mod,2}=\alpha_1+0.001\cdot 2$ and $\alpha_{2mod,2}=\alpha_2\pm 0.003\cdot 2$.

As a result of multiplying the two modified random numbers $\alpha_{1mod}$ and $\alpha_{2mod}$ by the initial amplitudes and initial phases of the electrical signals, modified randomized signals are obtained. As a result of the modification sub-iterative procedure, in each sub iteration p, for each transmission channel n (n=1, 2, . . . , N), each modified randomized signal has a corresponding modified randomized phase $(\varphi_{mod})_p$ and a modified randomized amplitude $(A_{mod})_p$. The modified randomized signals for the k-th frequency $f_k$ can be represented by a modified excitation vector $V_k^{mod}$:

$$V_k^{mod} = \begin{pmatrix} A_{mod,1}e^{j\varphi_{mod,1}} \\ A_{mod,2}e^{j\varphi_{mod,2}} \\ A_{mod,3}e^{j\varphi_{mod,3}} \\ \vdots \\ A_{mod,N}e^{j\varphi_{mod,N}} \end{pmatrix}_k$$

As shown in FIG. 5, the method also includes calculating (block 53) the transmission efficiency coefficient $T_{mod,k}$ for these modified randomized signals in each sub-iteration. The transmission efficiency coefficient $T_{mod,k}$ is calculated by using equations (1), (3) and (4), mutatis mutandis.

As also shown in FIG. 5, the method also includes comparing (block 54) the transmission efficiency coefficient $T_{mod,k}$ for the modified randomized signals obtained in the previous step (block 53) with the previously stored transmission efficiency coefficient in each sub-iteration and replacing (block 55) the previously stored transmission efficiency coefficient with the transmission efficiency coefficient $T_{mod,k}$ for the modified randomized signals when this transmission efficiency coefficient $T_{mod,k}$ is greater than the previously stored transmission efficiency coefficient.

In turn, when this transmission efficiency coefficient $T_{mod,k}$ is less than the previously stored transmission efficiency coefficient, the previously stored transmission efficiency coefficient remains unchanged (block 56).

The stored efficiency coefficient obtained after completing the predetermined number P of the sub-iterations is referred to herein as "highest transmission efficiency coefficient $T_h$" and the corresponding excitation vector is referred to herein as "optimal excitation vector $V_k^h$". It should be understood that optimal transmission efficiency coefficient $T_h$ is the maximal transmission efficiency coefficient obtained during the P sub-iterations. The optimal excitation vector $V_k^h$, represents the modified randomized signals for which the transmission efficiency coefficient $T_{mod,k}$ is greater than the transmission efficiency coefficient $T_{ran,k}$ of the randomized signals.

Turning back to FIG. 4, after completing the predetermined number P of sub-iterations in the method 50 described above, the method 40 further includes comparing the highest transmission efficiency coefficient $T_h$ obtained in the method 50 with the predetermined threshold value X in each iteration of the modification system 31. Modified randomized signals for which the highest transmission efficiency coefficient $T_h$ is greater than the predetermined threshold value X are the optimal modified signals.

According to an embodiment, the method 40 of operation of the transmission system 30 also includes relaying (block 105) the optimal electrical signals including the modified randomized signals from the optimal efficiency determination system 310 (in FIG. 3) and the optimal unmodified signals obtained from the RF signal generator 11 for which the transmission efficiency coefficients are equal to or greater than the predetermined threshold value X to the steering system 13.

In turn, when optimal transmission efficiency coefficient $T_{opt}$ for the optimal electrical signals is less than the predetermined threshold value X, a further iteration is performed by the modification system 31. The iterative modification is performed by the modification system 31 until the optimal transmission efficiency coefficient $T_{opt}$ for the modified randomized signals is equal to or greater than the predetermined threshold value X.

Figure 6:
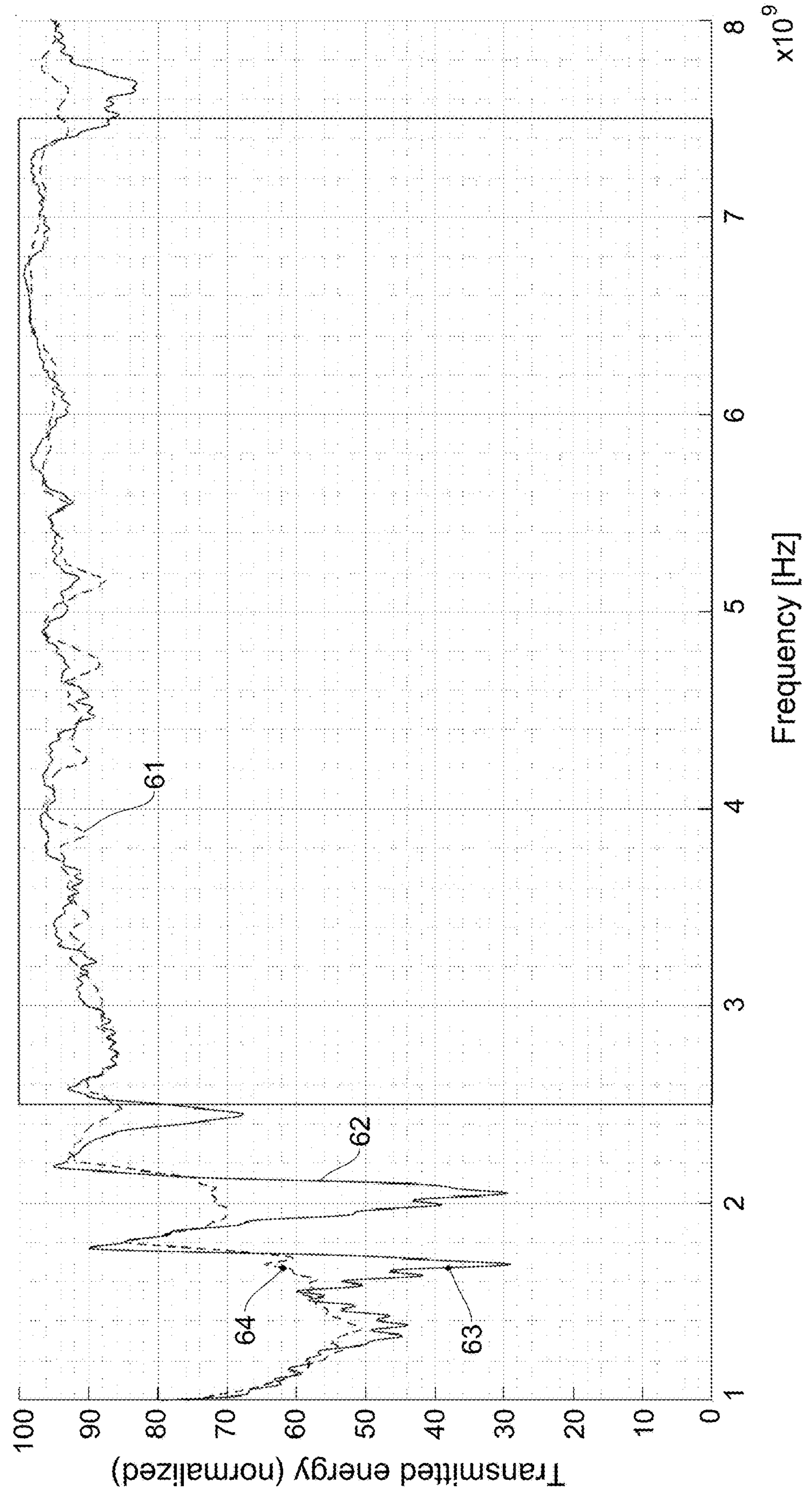
FIG. 6 illustrates an example of the frequency dependence of the transmitted energy of the transmission system shown in FIG. 3 and the frequency dependence of the transmitted energy of a conventional system, which does not include the modification system.

Referring to FIG. 6, examples of the frequency dependence (curve 61) of the transmitted energy of the transmission system 30 shown in FIG. 3 and the frequency dependence (curve 62) of the transmitted energy of a conventional system, which does not include the modification system 31, are illustrated. As mentioned above, null points occur at the frequencies at which the amount of the transmitted energy is less than a certain predetermined threshold value. For example, this threshold value can be in the range of 70%-90%.

As can be seen in FIG. 6, several null points appear on a curve 62 at the frequencies below 2.5 GHz. For example, a point 63 at frequency 2.1 GHz is a null point, since the transmitted energy corresponding to this point is less than 40%. As can also be seen, adding the modification system 31 to a conventional system, can modify the transmitted energy characteristics. In particular, the transmitted energy is enhanced at the null points, which occur at the frequency range below 2.5 GHz. For example, at a point 64 on a curve 61 (which corresponds to the same frequency 2.1 GHz as the point 63 on curve 62) the transmitted energy is greater than 70%.

Thus, the implementation of the modification system 31 in a conventional system significantly extends the operation frequency band of the conventional system.

Figure 7A:
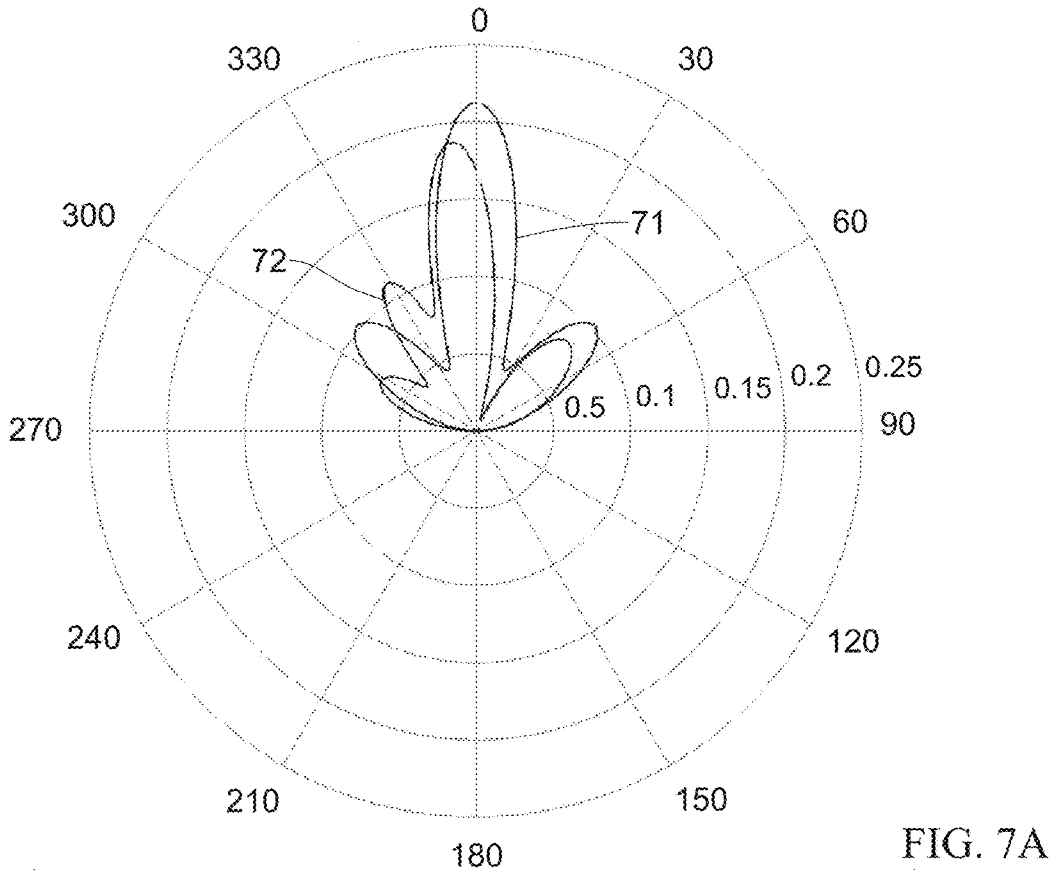
FIGS. 7A and 7B illustrate an example of a radiation azimuth pattern generated by the transmission system shown in FIG. 3 and a radiation azimuth pattern generated by a conventional system which does not include the modification system at two different frequencies, correspondingly.

FIG. 7A illustrates a radiation azimuth pattern 71 generated by the transmission system 30 shown in FIG. 3 at the frequency of 2.0269 GHz, and a radiation azimuth pattern 72 generated by a conventional system which does not include the modification system 31 at that same frequency.

As can be seen, the adding of the modification system 31 to the conventional system improves transmission characteristics in terms of both the gain and the directivity of transmission.

Figure 7B:
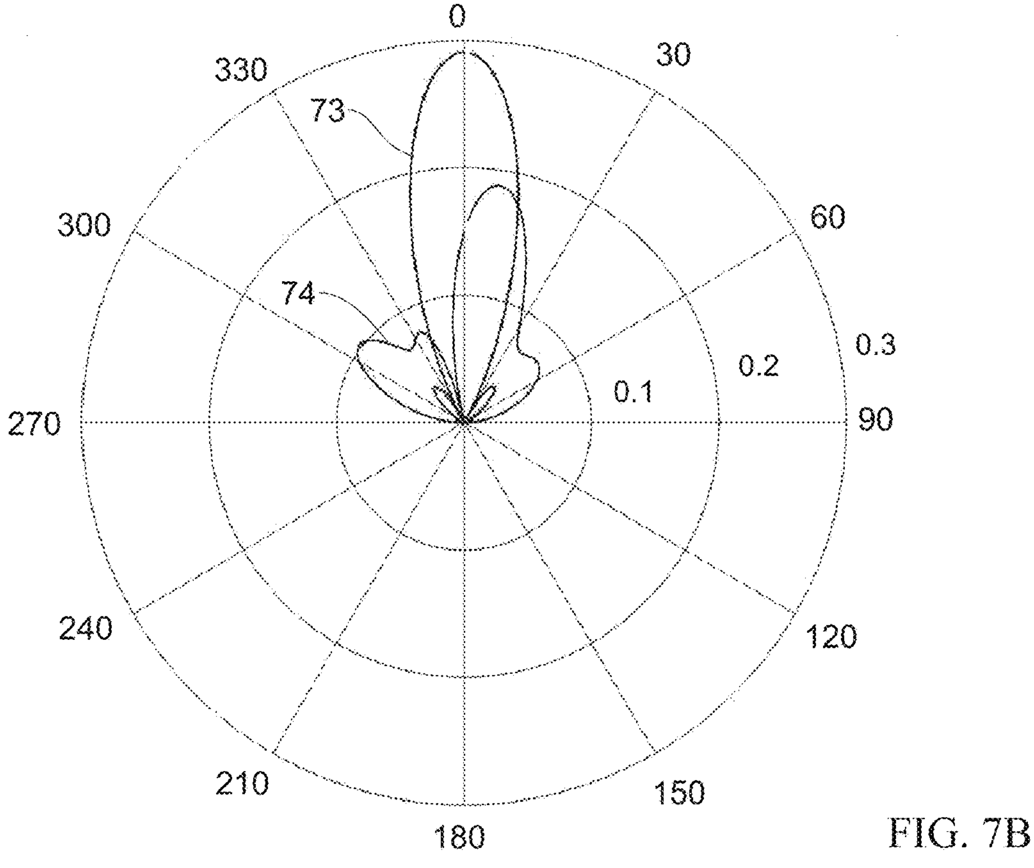

The improved transmission characteristics can also be observed in a broad frequency range. For example, FIG. 7B illustrates a radiation azimuth pattern 73 generated by the transmission system 30 shown in FIG. 3 at the frequency of 1.6725 GHz, and a radiation azimuth pattern 74 generated by a conventional system which does not include the modification system 31 at that same frequency.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A transmission system for transmitting radio frequency (RF) radiation in a predetermined direction at a sequence of K frequencies by an antenna array comprising a predetermined number N of multiple antenna elements, K and N being integers, comprising:

an RF signal generator configured for generating electrical signals having an initial amplitude and an initial phase through N transmission channels corresponding to N antenna elements, at the sequence of K frequencies;

a modification system arranged downstream of the RF signal generator, configured for receiving and processing the electrical signals from said RF signal generator for obtaining optimal electrical signals for which a transmission efficiency coefficient of the transmission system is equal to or greater than a predetermined threshold value, the optimal electrical signals including optimal unmodified signals provided by the RF signal generator and optimal modified signals generated by the modification system; and a steering system arranged downstream of said modification system and coupled to said antenna array, and configured for (i) receiving the optimal electrical signals obtained from the modification system, (ii) generating steering electrical signals from the optimal electrical signals and (iii) relaying the steering electrical signals via the N transmission channels to the antenna array to form a steered beam for transmission in the predetermined direction.

2. The transmission system of claim 1, wherein the modification system comprises:

an efficiency determination unit configured for receiving the electrical signals at the sequence of K frequencies from the RF signal generator and for calculating the transmission efficiency coefficient of the transmission system for each k-th frequency $f_k$;

a comparing unit configured for receiving the transmission efficiency coefficient for each k-th frequency $f_k$ from the efficiency determination unit, comparing the transmission efficiency coefficient with the predetermined threshold value, separating electrical signals corresponding to the frequencies for which the transmission efficiency coefficient is less than the predetermined threshold value from the electrical corresponding to the frequencies for which the transmission efficiency coefficient is equal to or greater than the predetermined threshold value, and providing the electrical signals corresponding to the frequencies for which the transmission efficiency coefficient is equal to or greater than the predetermined threshold value to the steering system; and a randomization unit configured for receiving the electrical signals corresponding to the frequencies for which the transmission efficiency coefficient is less than a predetermined threshold value, iteratively modifying these electrical signals by randomizing amplitude and phase of these electrical signals, thereby generating randomized signals, each randomized signal having a corresponding randomized amplitude and randomized phase, and providing in each iteration said randomized signals to the efficiency determination unit to calculate transmission efficiency coefficient for said randomized signals.

3. The transmission system of claim 2, wherein the optimal modified signals are the randomized signals for which the transmission efficiency coefficient is equal to or greater than the predetermined threshold value and the optimal unmodified signals are electrical signals having said initial amplitude and said initial phase for which the transmission efficiency coefficient is equal to or greater than the predetermined threshold value.

4. The transmission system of claim 2, wherein the modification system is configured for performing iterative modification of the electrical signals corresponding to the frequencies for which the transmission efficiency coefficient is less than the predetermined threshold value until the transmission efficiency coefficient for these electrical signals is equal to or greater than said predetermined threshold value.

5. The transmission system of claim 2, wherein the transmission efficiency coefficient is calculated by:

$$T_k = \frac{E_{trans}}{E_{total}} \cdot 100\%,$$

where $E_{total}$ is the total energy of the electrical signals for the k-th frequency $f_k$ generated by the RF signal generator and $E_{trans}$ is the energy transmitted in operation for the k-th frequency $f_k$ and where $E_{trans}$ is calculated by the efficiency determination unit by $E_{trans}=E_{total}-E_{lost}$, where $E_{lost}$ is the energy that is lost by the transmission system in operation for the k-th frequency $f_k$.

6. The transmission system of claim 5, wherein the lost energy $E_{lost}$ is calculated by:

$$E_{lost} = \sum_{n=1}^{N} |\tilde{s}|_n,$$

where $\tilde{s}_n$ is a combined energy that an n-th antenna element (n=1, 2, . . . , N) in the antenna array receives from neighboring antenna elements and a self-reflected energy of the n-th antenna element;

wherein said combined energy $\tilde{s}_n$ is calculated by:

$$\begin{pmatrix} \tilde{s}_1 \\ \tilde{s}_2 \\ \tilde{s}_3 \\ \vdots \\ \tilde{s}_N \end{pmatrix} = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_1} & \cdots s_{N_3} & \cdots & s_{N_N} \end{pmatrix} \cdot \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix},$$

where $$V_k^{init} = \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix}_k$$

is an initial excitation vector representing the electrical signals for N transmission channels for each k-th frequency $f_k$, and $$S = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_1} & \ldots s_{N_3} & \cdots & s_{N_N} \end{pmatrix}$$

is a coupling matrix characterizing mutual coupling between antenna elements and a self-reflected energy of the antenna elements in the antenna array; and wherein the transmitted energy $E_{trans}$ of the transmission system is calculated by:

$$E_{trans} = E_{total} - E_{lost} = \sum_{n=1}^{N} \left| A_n e^{j\varphi_n} \right| - \sum_{n=1}^{N} |\tilde{s}|_n.$$

7. The transmission system of claim 5, wherein randomizing of the amplitude and the phase of the electrical signals is carried out by iteratively generating two random numbers, each in the interval [0, 1], and multiplying the initial amplitude and the initial phase of said electrical signals by the two random numbers, correspondingly; thereby generating said randomized signals.

8. The transmission system of claim 7, wherein the modification system further includes an optimal efficiency determination system arranged downstream of the randomization unit and coupled to the comparing unit and to the efficiency determination unit, said optimal efficiency determination system is configured for sub-iteratively modifying said two random numbers thereby, generating in each sub-iteration two modified random numbers, and generating modified randomized signals for which the transmission efficiency coefficient is greater than the transmission efficiency coefficient of the randomized signals by using said two modified random numbers.

9. The transmission system of claim 8, wherein the optimal efficiency determination system is configured to perform a predetermined number P of sub-iterations to generate said modified randomized signals for which the transmission efficiency coefficient is greater than the transmission efficiency coefficient of the randomized signals provided by the randomization unit, P being an integer.

10. The transmission system of claim 9, wherein the optimal efficiency determination system comprises:

a modification unit configured for (i) receiving the electrical signals for which the transmission efficiency coefficient is less than the predetermined threshold value from the comparing unit and (ii) receiving the corresponding two random numbers for each electrical signal from the randomization unit and (iii) sub-iteratively modifying said electrical signals, thereby generating said modified randomized signals;

an efficiency determination sub-unit arranged downstream of the modification unit configured for sub-iteratively receiving the modified randomized signals from the modification unit and calculating a transmission efficiency coefficient for these modified randomized signals;

a storing unit configured for storing the transmission efficiency coefficient for the modified randomized signals and a corresponding excitation vector sub-iteratively received from the efficiency determination sub-unit, and storing the transmission efficiency coefficient for the randomized signals, and a corresponding randomized vector iteratively obtained from the efficiency determination unit; and a comparing sub-unit coupled to the storing unit configured for sub-iteratively receiving a stored efficiency coefficient from the storing unit and the transmission efficiency coefficient for the modified randomized signals from the efficiency determination sub-unit, sub-iteratively comparing the stored efficiency coefficient with the transmission efficiency coefficient of the modified randomized signals, and providing the transmission efficiency coefficient for the modified randomized signals and the corresponding excitation vector to the storing unit for storing thereof when the value of this transmission efficiency coefficient for the modified randomized signals is greater than the value of said stored efficiency coefficient.

11. The transmission system of claim 10, wherein the modification of the electrical signals corresponding to the frequencies for which the transmission efficiency coefficient is less than the predetermined threshold value by the modification unit is carried out by multiplying the initial amplitude and initial phase of each electrical signal by corresponding two modified random numbers.

12. A method for transmitting radio frequency (RF) radiation in a predetermined direction at a sequence of K frequencies by an antenna array comprising a predetermined number N of multiple antenna elements, K and N being integers, comprising:

generating electrical signals having an initial amplitude and an initial phase at a sequence of K frequencies;

processing the electrical signals and obtaining optimal electrical signals for which the transmission efficiency coefficient is equal to or greater than a predetermined threshold value, the optimal electrical signals including optimal unmodified signals and optimal modified signals;

generating steering electrical signals from the optimal electrical signals; and forming a steered beam based on the steering electrical signals for transmission in the predetermined direction.

13. The method of claim 12, wherein the obtaining of the optimal electrical signals comprises:

calculating a transmission efficiency coefficient for each k-th frequency $f_k$ of the sequence of K frequencies;

comparing the transmission efficiency coefficient for each k-th frequency $f_k$ with a predetermined threshold value;

separating electrical signals corresponding to the frequencies for which the transmission efficiency coefficient is less than the predetermined threshold value from the electrical corresponding to the frequencies for which the transmission efficiency coefficient is equal to or greater than the predetermined threshold value;

iteratively modifying the electrical signals corresponding to the frequencies for which the transmission efficiency coefficient is less than a predetermined threshold value by randomizing amplitude and phase of these electrical signals, thereby generating randomized signals; and providing optimal electrical signals including optimal unmodified signals and optimal modified signals.

14. The method of claim 13, wherein the optimal modified signals are the randomized signals for which the transmission efficiency coefficient is equal to or greater than the predetermined threshold value, and the optimal unmodified signals are the electrical signals having said initial amplitude and said initial phase for which the transmission efficiency coefficient is equal to or greater than the predetermined threshold value.

15. The method of claim 13, wherein the iteratively modifying of the electrical signals corresponding to the frequencies for which the transmission efficiency coefficient is less than the predetermined threshold value, is performed until the transmission efficiency coefficient for these electrical signals is equal to or greater than said predetermined threshold value thereby generating the optimal modified signals.

16. The method of claim 12, wherein the transmission efficiency coefficient is calculated by:

$$T_k = \frac{E_{trans}}{E_{total}} \cdot 100\%,$$

where $E_{total}$ is the total energy of the electrical signals for the k-th frequency $f_k$, $E_{trans}$ is the energy transmitted in operation for the k-th frequency $f_k$ and where $E_{trans}$ is calculated by $E_{trans}=E_{total}-E_{lost}$, where $E_{lost}$ is the energy that is lost in operation for the k-th frequency $f_k$;

wherein the lost energy $E_{lost}$ is calculated by:

$$E_{lost} = \sum_{n=1}^{N} |\tilde{s}|_n$$

where $\tilde{s}_n$ is a combined energy that an n-th antenna element in the antenna array receives from neighboring antenna elements and a self-reflected energy of the n-th antenna element;

wherein said combined energy $\tilde{s}_n$ is calculated by:

$$\begin{pmatrix} \tilde{s}_1 \\ \tilde{s}_2 \\ \tilde{s}_3 \\ \vdots \\ \tilde{s}_N \end{pmatrix} = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_1} & \ldots s_{N_3} & \cdots & s_{N_N} \end{pmatrix} \cdot \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix},$$

where $$V_k^{init} = \begin{pmatrix} A_1 e^{j\varphi_1} \\ A_2 e^{j\varphi_2} \\ A_3 e^{j\varphi_3} \\ \vdots \\ A_N e^{j\varphi_N} \end{pmatrix}_k$$

is an initial excitation vector representing the electrical signals for N transmission channels for each k-th frequency $f_k$ and $$S = \begin{pmatrix} s_{1_1} & s_{1_2} & s_{1_3} & \cdots & s_{1_N} \\ s_{2_1} & s_{2_2} & s_{2_3} & \cdots & s_{2_N} \\ s_{3_1} & s_{3_2} & s_{3_3} & \cdots & s_{3_N} \\ \vdots & \vdots & \vdots & \ddots & \vdots \\ s_{N_1} & s_{N_1} & \ldots s_{N_3} & \cdots & s_{N_N} \end{pmatrix}$$

is a coupling matrix characterizing mutual coupling between antenna elements and the self-reflected energy of the antenna elements in the antenna array; and wherein the transmitted energy $E_{trans}$ of the transmission system is calculated by:

$$E_{trans} = E_{total} - E_{lost} = \sum_{n=1}^{N} \left| A_n e^{j\varphi_n} \right| - \sum_{n=1}^{N} |\tilde{s}|_n.$$

17. The method of claim 16, wherein randomizing the amplitude and the phase of the electrical signals is carried out by generating two random numbers, each in the interval [0, 1], and multiplying the initial amplitude and the initial phase of said electrical signals by the two random numbers, correspondingly.

18. The method of claim 13, wherein the iteratively modifying of the electrical signals further includes providing modified randomized signals for which the transmission efficiency coefficient is greater than the transmission efficiency coefficient of the randomized signals.

19. The method of claim 18, wherein the providing of the modified randomized signals for which the transmission efficiency coefficient is greater than the transmission efficiency coefficient of the randomized signals comprises:

receiving and storing the transmission efficiency coefficient of the randomized signals and a corresponding randomized excitation vector;

sub-iteratively modifying the electrical signals corresponding to the frequencies for which the transmission efficiency coefficient is less than the predetermined threshold value, thereby generating the modified randomized signals;

sub-iteratively calculating a transmission efficiency coefficient for these modified randomized signals;

sub-iteratively comparing the transmission efficiency coefficient for the modified randomized signals with a previously stored transmission efficiency coefficient; and sub-iteratively replacing the previously stored transmission efficiency coefficient and the previously stored randomized excitation vector with the transmission efficiency coefficient for the modified randomized signals and a corresponding modified excitation vector when the transmission efficiency coefficient for the modified randomized signals is greater than the previously stored transmission efficiency coefficient.

20. The method of claim 19, wherein the providing of the modified randomized signals for which the transmission efficiency coefficient is greater than the transmission efficiency coefficient of the randomized signals is carried out by performing a predetermined number P of sub-iterations, P being an integer; and wherein the sub-iteratively modifying of the electrical signals corresponding to the frequencies for which the transmission efficiency coefficient is less than the predetermined threshold value, is carried out by multiplying the initial amplitude and initial phase of each electrical signal by corresponding two modified random numbers.

* * * * *